(12) United States Patent
Grim, III et al.

(10) Patent No.: US 8,224,725 B2
(45) Date of Patent: Jul. 17, 2012

(54) ESCROWING DIGITAL PROPERTY IN A SECURE INFORMATION VAULT

(75) Inventors: Clifton E. Grim, III, Seabrook, TX (US); Christopher I. Schmidt, Friendswood, TX (US); John D. Wilson, Houston, TX (US)

(73) Assignee: Google Inc., Mountain View, CA (US)

( * ) Notice: Subject to any disclaimer, the term of this patent is extended or adjusted under 35 U.S.C. 154(b) by 2154 days.

(21) Appl. No.: 11/227,539

(22) Filed: Sep. 15, 2005

(65) Prior Publication Data

US 2006/0085314 A1 Apr. 20, 2006

Related U.S. Application Data

(63) Continuation-in-part of application No. 10/965,592, filed on Oct. 14, 2004, now Pat. No. 7,587,366.

(51) Int. Cl.
*G06Q 40/00* (2006.01)
(52) U.S. Cl. ........................................................ 705/35
(58) Field of Classification Search .................. 705/35
See application file for complete search history.

(56) References Cited

U.S. PATENT DOCUMENTS

| | | | | |
|---|---|---|---|---|
| 1,378,673 A * | 5/1921 | Graton | ........................... | 283/103 |
| 4,974,878 A * | 12/1990 | Josephson | ....................... | 283/67 |
| 5,267,314 A * | 11/1993 | Stambler | ....................... | 713/176 |
| 5,426,281 A * | 6/1995 | Abecassis | ....................... | 235/379 |
| 5,892,900 A | 4/1999 | Ginter et al. | | |
| 5,910,988 A | 6/1999 | Ballard | | |
| 5,933,498 A * | 8/1999 | Schneck et al. | ................. | 705/54 |
| 6,105,131 A | 8/2000 | Carroll | | |
| 6,141,423 A * | 10/2000 | Fischer | ......................... | 380/286 |
| 6,182,050 B1 | 1/2001 | Ballard | | |
| 6,216,229 B1 | 4/2001 | Fischer | | |
| 6,247,127 B1 | 6/2001 | Vandergeest | | |
| 6,249,772 B1 * | 6/2001 | Walker et al. | ................... | 705/26 |
| 6,298,348 B1 | 10/2001 | Eldering | | |
| 6,324,650 B1 * | 11/2001 | Ogilvie | ............................. | 726/2 |
| 6,334,109 B1 | 12/2001 | Kanevsky et al. | | |
| 6,438,690 B1 | 8/2002 | Patel et al. | | |
| 6,631,397 B1 | 10/2003 | Satomi et al. | | |
| 6,687,710 B1 * | 2/2004 | Dey | ............................ | 705/36 R |
| 6,954,753 B1 * | 10/2005 | Jeran | .............................. | 707/10 |

(Continued)

FOREIGN PATENT DOCUMENTS

WO WO 02/29516 4/2002

(Continued)

OTHER PUBLICATIONS

"ATX Communications Partners with IPR International; ATX to Leverage IPR's Proven Online Data Backup Solutions."; Oct. 12, 2004; PR Newswire.*

(Continued)

*Primary Examiner* — Leland Marcus

(57) ABSTRACT

Digital data can be escrowed by receiving escrow parameters including a condition(s) for releasing the escrowed data, and an escrow recipient. An escrow contract is then created based upon the specified escrow parameters. The escrowing further includes storing the digital data in a secure information vault, and storing the escrow contract, along with a pointer to the stored data, in a database. When the condition has been satisfied, the data is released to the escrow recipient. The condition(s) for release can be a payment sum, a date, an indication from a depositor, a trustee or a vault administrator, and/or fulfillment of another escrow contract.

12 Claims, 24 Drawing Sheets

U.S. PATENT DOCUMENTS

| | | | |
|---|---|---|---|
| 6,993,326 B2 | 1/2006 | Link et al. | |
| 7,013,388 B2 | 3/2006 | Fisk et al. | |
| 2001/0048770 A1* | 12/2001 | Maeda | 382/243 |
| 2002/0026395 A1* | 2/2002 | Peterson | 705/35 |
| 2002/0107027 A1 | 8/2002 | O'Neil | |
| 2002/0107803 A1 | 8/2002 | Lisanke et al. | |
| 2002/0112153 A1 | 8/2002 | Wu et al. | |
| 2002/0112162 A1 | 8/2002 | Cocotis et al. | |
| 2003/0033199 A1 | 2/2003 | Coleman | |
| 2003/0055779 A1* | 3/2003 | Wolf | 705/39 |
| 2003/0079133 A1 | 4/2003 | Breiter et al. | |
| 2003/0093369 A1* | 5/2003 | Ijichi et al. | 705/39 |
| 2003/0191716 A1 | 10/2003 | Woods et al. | |
| 2003/0204447 A1 | 10/2003 | Dalzell et al. | |
| 2003/0220884 A1* | 11/2003 | Choi et al. | 705/64 |
| 2003/0225693 A1 | 12/2003 | Ballard et al. | |
| 2004/0030624 A1* | 2/2004 | Nishimaki | 705/35 |
| 2004/0098366 A1 | 5/2004 | Sinclair et al. | |
| 2004/0221920 A1 | 11/2004 | Ferguson et al. | |
| 2006/0085254 A1 | 4/2006 | Grim, III et al. | |
| 2006/0085344 A1 | 4/2006 | Grim, III et al. | |

FOREIGN PATENT DOCUMENTS

| | | | |
|---|---|---|---|
| WO | WO 02/29516 A2 | 4/2002 | |

OTHER PUBLICATIONS

"Symbiat Becomes Storage Service Provider for SMB Market; Symbiat Adds Secure Data Backup Services via Strategic Partnership with DataAssure"; Feb. 27, 2003; Business Wire.*

F. Bastani, et al., "A High-Assurance Measurement Repository System", Proceedings. Fifth IEEE International Symposium on High Assurance Systems Engineering (HASE 2000), pp. 265-272.

S. Ye, et al., "SCENS: A System for the Mediated Sharing of Sensitive Data", Proceedings of the 2003 Joint Conference on Digital Libraries.

Karen Seo, et al., "Public-Key Infrastructure for the Secure Border Gateway Protocol (S-BGP)", IEEE, 2001, pp. 239-253.

Srdjan Čapkun, et al., "Mobility Helps Security in Ad Hoc Networks", MobiHoc 2003, pp. 46-56.

Lidong Thou, et al., "COCA: A Secure Distributed Online Certification Authority", ACM Transactions on Computer Systems, vol. 20, No. 4, Nov. 2002, pp. 329-368.

F. Bastani et al., "A High-Assurance Measurement Repository System", Proceedings Fifth IEEEE International Symposium on High Assurance Systems Engineering (HASE 2000), pp. 265-272.

S. Ye et al., "SCENS: a System for the Mediated Sharing of Sensitive Data", Proceedings of the 2003 Joint Conference on Digital Libraries.

K. Seo et al., "Public—Key Infrastructure for the Secure Border Gateway Protocol (S-BGP)", IEEE, 2001, pp. 239-253.

S. Capkun et al., "Mobility Helps Security in AD Hoc Networks", MobiHoc 2003, pp. 46-56.

L. Zhou et al, "COCA: A Secure Distributed Online Certification Authority", ACM Transactions on Computer Systems, vol. 20, No. 4, Nov. 2002, pp. 329-368.

Office Action for corresponding U.S. Appl. No. 11/082,489.

Notice of Allowance for corresponding U.S. Appl. No. 10/965,592.

* cited by examiner

US 8,224,725 B2

ESCROWING DIGITAL PROPERTY IN A SECURE INFORMATION VAULT

CROSS REFERENCE TO RELATED APPLICATION

The present application is a continuation-in-part of U.S. patent application Ser. No. 10/965,592 filed on Oct. 14, 2004, now U.S. Pat. No. 7,587,366 issued Sep. 8, 2009, the disclosure of which is expressly incorporated by reference in its entirety.

FIELD OF THE INVENTION

The invention generally relates to an information vault and, more particularly, to enabling two parties to securely escrow property in the information vault.

BACKGROUND DESCRIPTION

As the world becomes more wired and electronic storage becomes cheaper than the cost of paper, the protection of information becomes paramount. The ease with which information can be copied and propagated causes serious information privacy issues. Keeping information safe and secure is thus one of the biggest issues facing the information technology (IT) industry today.

There are several areas of concern regarding the protection of information including the danger of unrecoverable loss of the information itself and defense against unauthorized copying of the digital information. Also, the control of access to the information may pose certain risk factors to the owner of the information and to the thousands of other organizations who hold copies of this information for business reasons. Ultimately, there may be a potential loss of financial opportunity based on the use of the information.

Although secure information vaults exist, there are no known mechanisms for leveraging such vaults for securely escrowing property, such as digital intellectual property, between two parties. A need for a secure escrow exists, for example, when escrowing development level representations (e.g., software, building designs, visual models, etc.) of property purchased or licensed at a representational level (e.g., executable code 3D models, movie elements, etc.) for the purposes of protecting the second party from injury if the first party does not fulfill contract requirements.

Another need exists when escrowing non-tangible, digital property during a series of negotiations. The secure escrow protects the parties that may be relying on the value of the property during interim steps in the negotiation. A similar need exists when escrowing tangible assets, as well as legal documents that have been digitally signed by the parties. Digital layaways are another type of transaction that would benefit from such a system.

SUMMARY OF THE INVENTION

In a first aspect, a method is provided for escrowing digital data. The method includes receiving escrow parameters, such as a condition for releasing the escrowed data, and an escrow recipient. The method also includes storing the digital data in a secure information vault. An escrow contract is created based upon the specified escrow parameters, and is stored in a database along with an association (e.g., a pointer) to the stored digital data. When it is determined that the condition has been satisfied, the data is released to the escrow recipient.

In a second aspect, a system for escrowing digital data includes a server, a secure information vault, and a contract database. The server provides information vault services that receive the digital data, and receive escrow parameters including at least one condition for releasing the escrowed data and an escrow recipient. The secure information vault stores the digital data. The contract database stores an escrow contract, along with a pointer to the digital data stored in the secure information vault. The escrow contract includes the condition(s) and the escrow recipient. The server determines when the at least one condition has been satisfied, and when the at least one condition has been satisfied, the server releases the digital data to the escrow recipient.

In a third aspect, an apparatus is provided for escrowing digital data. The apparatus includes a processor and a memory that, in response to instructions, together provide vault services that receive the digital data and store the digital data in a vault. They also receive escrow parameters including at least one condition for releasing the escrowed data and an escrow recipient. The vault services create an escrow contract including the condition(s) and the escrow recipient. The vault services determines when the at least one condition has been satisfied, and when the at least one condition has been satisfied, the vault services release the digital data to the escrow recipient.

DETAILED DESCRIPTION OF EMBODIMENTS

Information Vault

This invention is, generally, in one embodiment, directed to a system and method for providing an information vault so that individual owners of personal data may control and manage the access and dissemination of the personal data. The system and method also provides for the owner of the personal data to receive compensation for the use of the personal data, thus, in effect, the personal data becomes a valuable commodity analogous to money. The invention provides a business model that allows competitive, unbiased trusted third parties whose business is protecting the information analogous to how a commercial bank protects money.

To this end, the system and method of the invention provide a trusted storage of personal data, thereby minimizing the number of copies that may be in existence. Second party access to the trusted storage of personal data may be made on-demand, as required for commerce, with a process for assessing fees for accesses.

Figure 1:
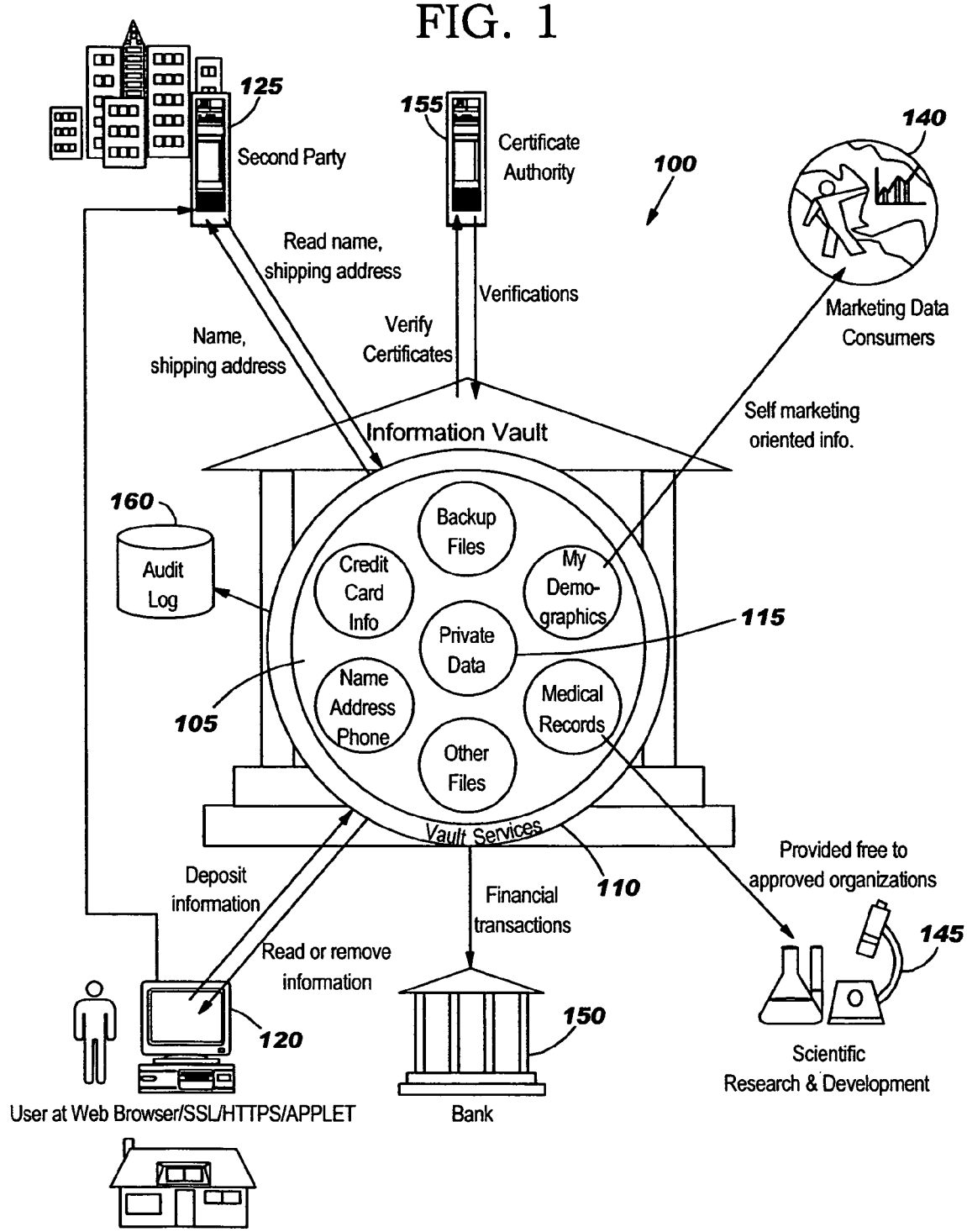
FIG. 1 is an exemplary overview of an embodiment of the invention.

FIG. 1 is an exemplary overview of an embodiment of the invention. An "Information Vault", generally denoted by reference numeral 100, provides for an information infrastructure patterned somewhat after the currency model of the world's financial infrastructure, for example. The vault 100 employs current data storage 105 and security technologies to provide a secure storage mechanism for user's information, such as for example, name, address, phone numbers, medical records, credit card information, demographic information, or similar personal data. Certain information may be encrypted by the owner to make the data totally private, even from the vault, as denoted by reference numeral 115. A computer system 120 (e.g., a personal computer) may be employed by a user to read or remove information from the vault or to deposit information to the vault.

A set of services 110 are provided, built on the vault's secure storage, to allow users to create accounts, deposit information in any form, and read or remove the information. Information may be stored in the vault encrypted by the vault and optionally, users may encrypt the information with their own private key.

In addition, the vault services 110 are provided to allow a user to specify conditions, in a secure way via technologies of the existing Public Key Infrastructure (PKI), so that a second party 125 may have read access to certain, sharable portions of the user's information. All accesses typically use the first and second party's public keys as identification. To share information with a second party, a contract data token specifying the two parties' public keys may be created and digitally signed by the first party's private key to ensure that access to private information is not propagated beyond the second party. This feature of the invention allows a migration away from the current approach of users providing second party entities (e.g., online web merchants) their personal information and thereafter compelled to trust the merchants to securely protect the information from compromise.

With this invention's approach, the user provides the second party 125 permission to read an agreed upon set of personal information. As the information is thereafter always available to the second party (at least until cancellation or recasting of the contract), there is no longer any need for the second party to store the user's personal information within its own databases. As a trusted third party for information, then, the information vault 100 significantly contributes to the elimination of the escalating dangers of identity theft.

The system may also allow second parties to request certain processing or services which may significantly eliminate the need for the second party 125 to ever see the personal information of the first party. Provision is also made in the system for a user to specify personal information (e.g., my consumer preferences and demographics) that the vault may make publicly available for commercial purposes such as marketing data consumers 140, with proceeds going to the user/owner, or otherwise, made publicly available for free for charitable or scientific purposes 145.

FIG. 1 shows that the invention is based on, and does not replace, the financial network for payments (e.g., banking 150) for information vault services or Certificate Authorities 155 of the PKI for certificate and key verifications. The interface to the bank 150 may include interfaces to financial networks for debits and payments for vault transactions and services. The invention may also provide audit logs 160 of transactions.

The invention, therefore, establishes the concept of information as "money" or "currency" itself. This implies that an information repository may be built that is modeled on a financial bank. Information may be deposited, withdrawn, shared, processed upon and protected in a safety deposit box. Additionally, the information, itself, may be used to generate income.

To this end, as described above and in more detail below, the invention is capable of providing underlying technology and business processes for providing an information vault, exchange and processing system that include in embodiments:

- a technique that allows information to be deposited in the vault;
- a controlled access method to remove this information from the vault;
- an intermediary service so that information may be effectively escrowed and then delivered to the appropriate party as needed as opposed to requiring the second party to store the information locally;
- a method to track consumers of certain information sets;
- an infrastructure that allows certain classes of information to generate income for the owner;
- a dual key safety deposit box for information such that only a specified party will be able to gain access;
- the ability to allow the repository to perform certain functions on the data of one or more parties; and/or
- the technique and method to financially charge for the above services.

Figure 2:
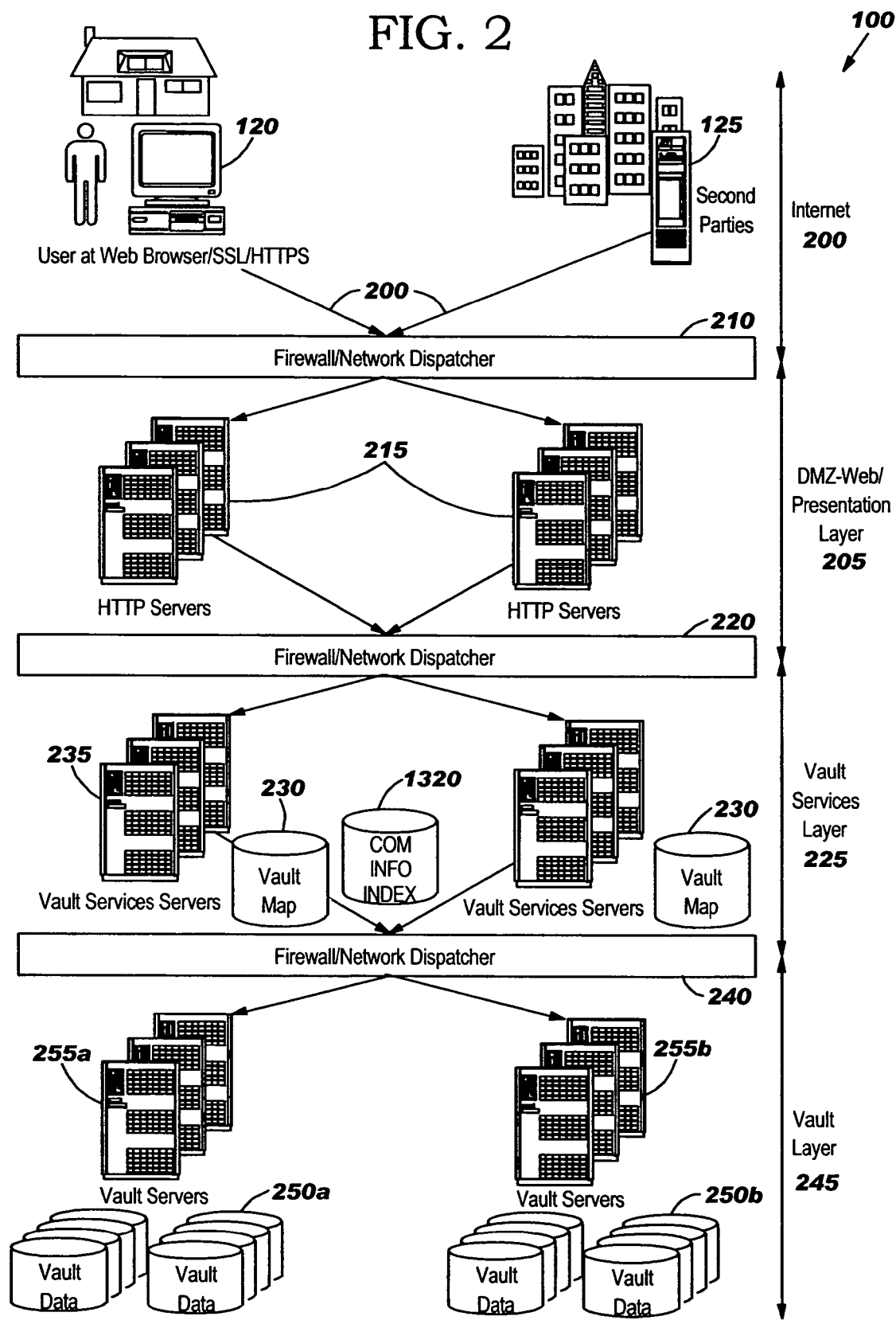
FIG. 2 is a block diagram of an embodiment of a physical information vault architecture.

FIG. 2 is a block diagram of an embodiment of a physical information vault architecture. The Information Vault 100 comprises a typical three tier networking architecture. A user, via user computer 120, and second party or parties 125 may access the Information Vault 100 with a secure connection over the Internet 200 or similar connection.

The first tier layer 205 facing the open network is the DMZ (i.e., popularly referred to as the "demilitarized zone") or presentation tier. This layer sits behind a firewall/network dispatcher 210 and includes multiple HTTP Servers 215, possibly geographically separated for high availability reasons. This first tier layer 205 accepts requests from outside users and provides presentation level services for the requests. Service requests are passed on to the application services layer of the vault services.

Another firewall/network dispatcher 220 may be placed between the DMZ 205 and the vault services layer 225. The vault services layer 225 handles the business logic for the system, as described below. One or more databases 230 within the layer keep metadata and a mapping between uses and their associated information. The vault services layer 225 may additionally include a commercial information index as discussed in more detail below. When a service server 235 needs to retrieve information, a request is made through a third firewall/network dispatcher 240 to the Vault Layer 245. The Vault Layer 245 may be a highly redundant set of storage areas 250a and 250b, typically geographically separated. In addition, data may be sliced across the separated servers 255a and 255b so that no single compromise of security may provide access to user information. Other data security technologies may be applied to the information vault 100 in order to ensure integrity, as would be known to one of ordinary skill in the art.

Figure 3:
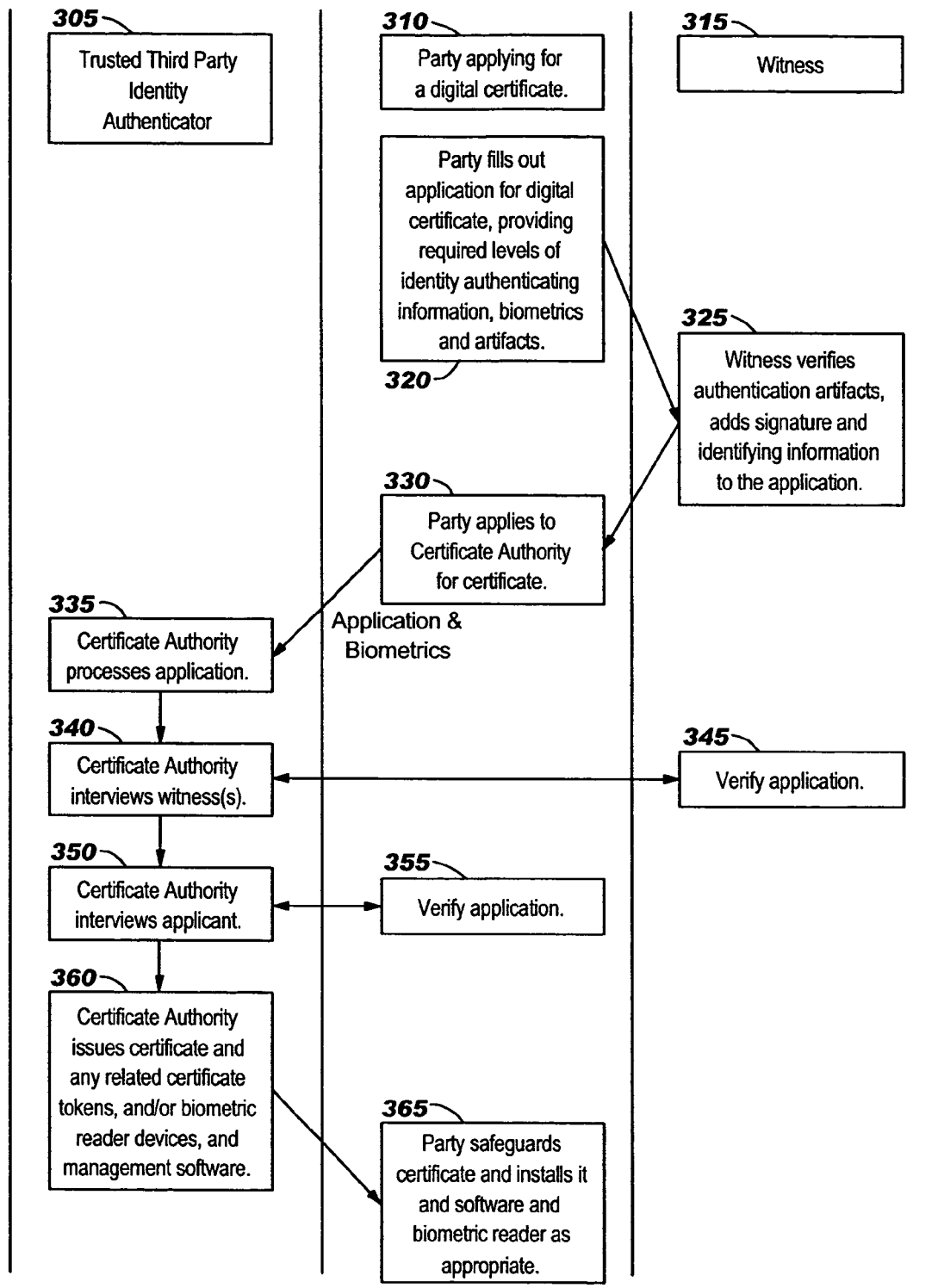
FIG. 3 is a swim lane diagram showing steps of an embodiment of a digital certificate creation.

FIG. 3 is a swim lane diagram showing steps of an embodiment of a digital certificate creation. "Swim lane" diagrams may be used to show the relationship between the various "actors" in the processes and to define the steps involved in the processes. FIG. 3 (and all the other swim lane Figures) may equally represent a high-level block diagram of components of the invention implementing the steps thereof.-The steps of FIG. 3 (and all the other FIGS. employing swim lane diagrams) may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network. The steps of FIG. 3 (and the other swim lane Figures) may also be implemented by the embodiments of FIGS. 1 and 2.

Referring to FIG. 3, three swim lanes are shown including a lane for Trusted Third Party Identity Authenticator 305 (e.g., certificate authority 155), a lane for the party applying (applicant) for a digital certificate 310, and a lane for a witness 315. At step 320, the applicant completes an application for a digital certificate providing any number of identity authenticating information predetermined by the vault provider, such as biometrics; personal information (e.g., name, address, age, financial data, date of birth, or the like) and artifacts.

At step 325, a witness(s) verifies the authentication artifacts and adds a signature and witness identification to the application. At step 330, the applicant applies to a certificate authority (e.g., certificate authority 155) for a certificate. At step 335, the certificate authority processes the application and checks for completeness. At step 340, the certificate authority interviews the witness(es) and at step 345 the witness(es) verify the application.

At step 350, the certificate authority interviews the applicant and at step 355, the applicant verifies the application. At step 360, the certificate authority issues a certificate and related certificate tokens and/or biometric reader devices, and management software. At step 365, the applicant safeguards the certificate and installs the certificate, management software, and biometric reader, as appropriate.

Figure 4:
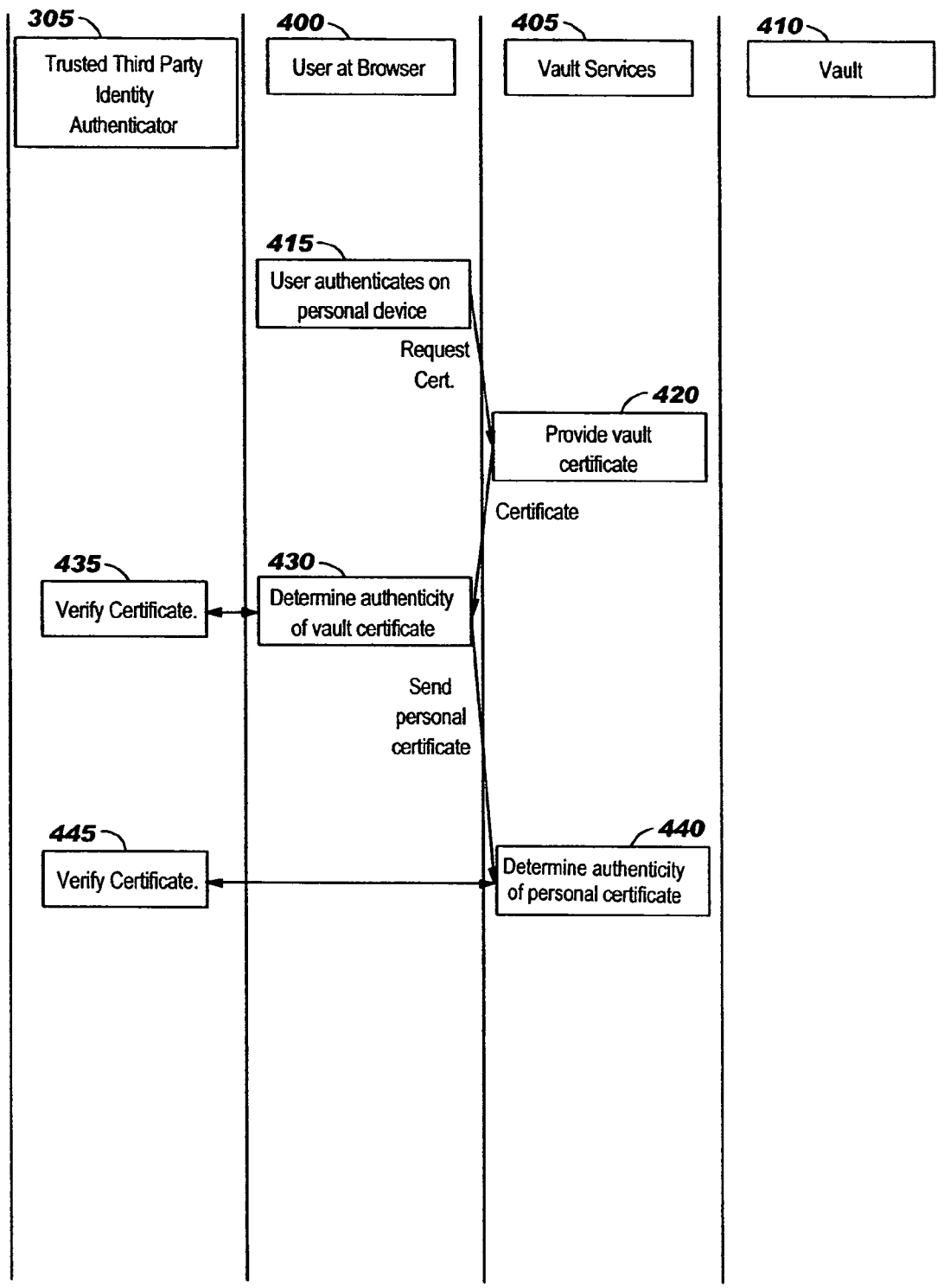
FIG. 4 is a swim lane diagram of an embodiment showing steps of mutual party authentication.

FIG. 4 is a swim lane diagram of an embodiment showing steps of mutual party authentication, beginning at step 415. Four lanes are shown including a lane for the trusted third party identity authenticator 305, a lane for a user (typically at a browser) 400, a lane for vault services 405, and a lane for the vault 410. At step 415, the user authenticates themselves on a personal device such as a biometric device and requests a certificate from the vault services via a browser or other technique.

At step 420, the vault service provides a certificate to the user. The certificate has identifying information of the information vault plus a signed hash from a trusted certificate authority (CA). A signature may be created by calculating a hash over the data using an algorithm that is one-way (i.e., the identifying information cannot be generated from the hash value). The signing entity encrypts the hash value with its private key. The encrypted data may be unencrypted using the public key.

At step 430, the user's PC receives the certificate and, at step 435, using a third party identity authenticator determines the authenticity of the certificate by calculating a hash over the information vault's certificate, decrypts the signed hash value from the CA and compares the resulting two values to verify the certificate. Equal values indicate that the information vault is actually the information vault. Thus, the information vault is authenticated from the user's perspective.

At step 440, the vault services receives the user's personal certificate and, determines its authenticity. At step 445, the authenticity of the user's personal certificate is determined in a like manner as the vault certificate and is authenticated by verifying the personal certificate. Thus, the personal certificate is authenticated by the third party authenticator and returned to the vault services. After this, the user's machine encrypts all traffic to the information vault using the information vault's public key, and the information vault encrypts data to the user with the user's public key. A secure transport such as secured socket layer (SSL) communication may be employed by the vault services.

Figure 5:
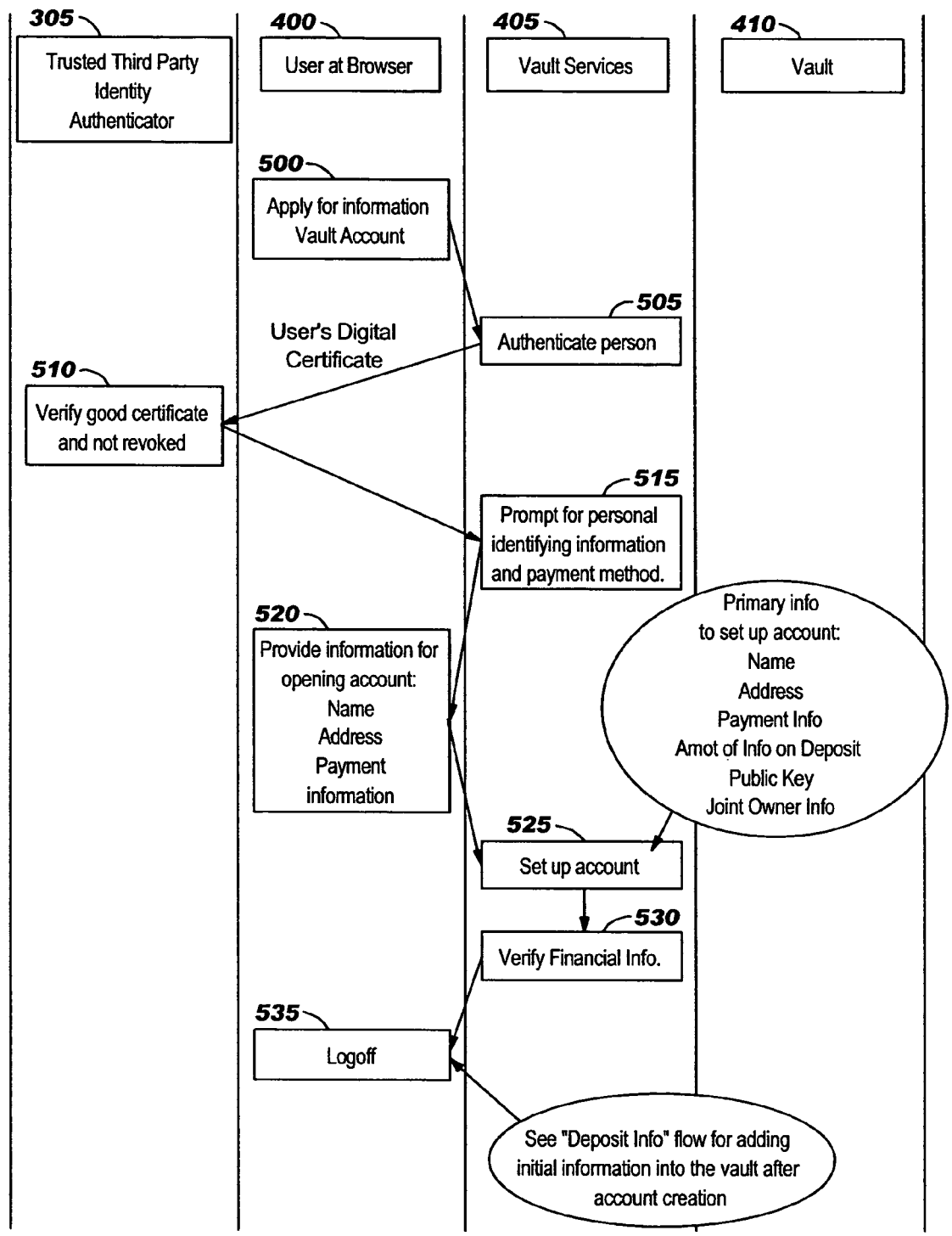
FIG. 5 is a swim lane diagram of an embodiment showing steps of creating an account.

FIG. 5 is a swim lane diagram of an embodiment showing steps of creating an account. At step 500, the user chooses to apply for an information vault account and access the information vault services supplying a personal digital certificate. At step, 505, the vault services determine the authenticity of the applicant/user, and, at step 510, using the third party authenticator, verifies the applicant's certificate. At step 515, the vault services prompt the user for personal and payment information. At step 520, the user/applicant provides information for opening an account such as name, address, date of birth, social security number, payment information, joint account information, or the like. At step 525, the vault services gather any demographic data and certificate public key to establish the applicant's account. Optionally, at step 530, the applicant's financial data is verified. At step 535, the account is established and the user/applicant may log off.

Figure 6:
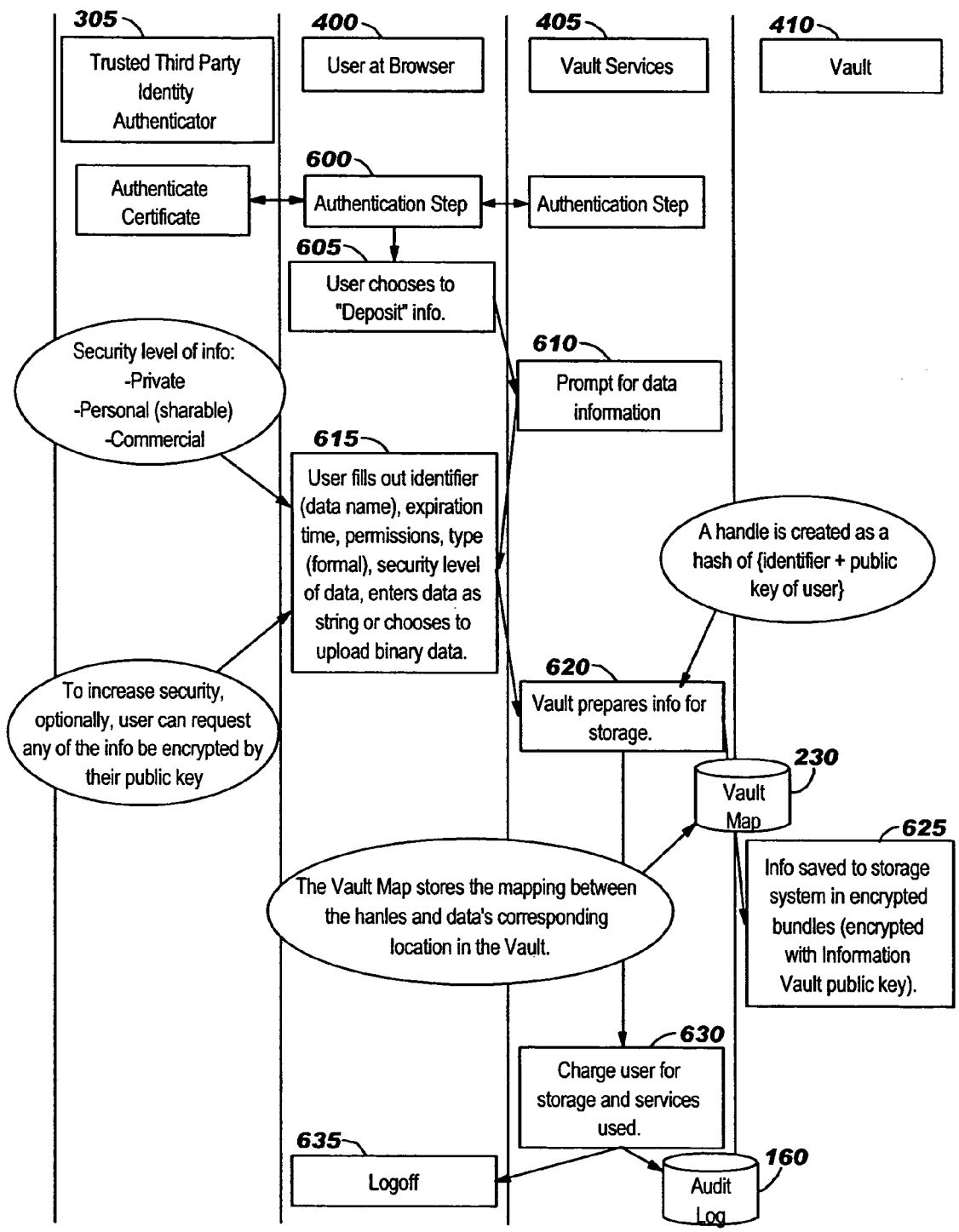
FIG. 6 is a swim lane diagram of an embodiment showing steps of depositing information into a user account.

FIG. 6 is a swim lane diagram of an embodiment showing steps of depositing information into a user account, beginning at step 600 where the user and vault services mutually authenticate one another (e.g., the process of FIG. 4). At step 605, the user may choose to deposit an item of information at the information vault. At step 610, a prompt is issued by the vault services for identifying the information (user created or pre-generated) such as permissions, expiration time, the security level (e.g., open, secure, anonymous/lock box). The user's device encrypts the information with public key of the information vault, which ensures that only the vault may read the information. The information may be transmitted to the information vault.

At step 615, the user enters data or chooses to upload binary data, e.g., the user may add a string of data or a binary file (binary can be any information, including, for example, a text file or video). The string data may include descriptive information about the information item and may describe the format of the information item itself. For private information, this field may optionally be used by the depositor to specify data format. For sharable information, the field may be set by the depositor and may be used to specify a pre-negotiated format identifier or set to a standard XML format. For commercial information, the depositor may select the type of commercial information to deposit, the associated Commercial Data Formatter (CDF) applet may be instantiated and the CDF sets the data type field accordingly. This string field is part of the descriptive information about the information item. It defines the access possibilities of the information item. At a minimum it can be set to: "Private", "Sharable", and "Commercial". The settings may have the following definitions in embodiments:

(i) Private: Only the information owner or joint owner may retrieve or remove the information item.

(ii) Sharable: The owner or joint owner may access the information item directly or a third party may access the item providing the third party has possession of an information contract for that item.

(iii) Commercial: The owner or joint owner may access the information item directly or a third party may access the item providing the third party is typically willing to pay a fee for the item.

At step 620, the vault services may use a one way hash algorithm to determine a hash location for the information. That is, the information may be stored on servers using a hash mechanism to create a unique identifier (handle) of the information (public key+information identifier), which may be used as the storage point for the information and remembered in the vault map 230. The information may be stored encrypted when creating a user account and may be encrypted with the information vault's public key. For open or secure security levels, the information may have metadata identifying the owner, permissions, etc. This allows the information vault to retrieve the information more easily at a later time. At step 625, the information may be saved to a storage system in encrypted bundles. A vault map may store the mapping between the handles and the data's corresponding location in the vault. At step 630, a charge may be applied to the user for the storage and use of the vault services. An audit log 160 may be kept of the transaction. At step 635, the user may log off.

Figure 7:
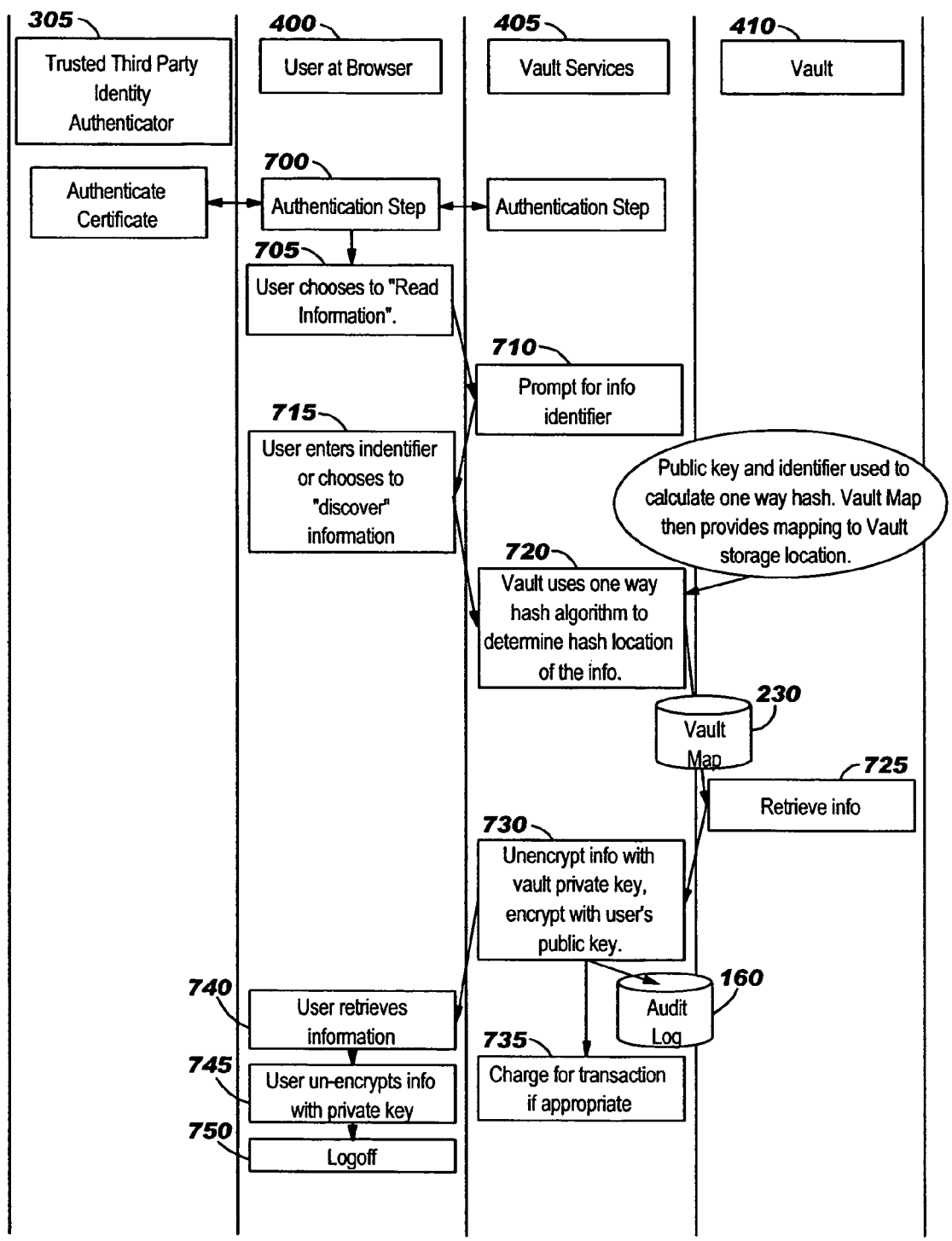
FIG. 7 is a swim lane diagram of an embodiment showing steps of reading information from an account.

FIG. 7 is a swim lane diagram of an embodiment showing steps of reading information from an account, beginning at step 700 where the user and vault services mutually authenticate one another (e.g., process of FIG. 4). At step 705, a user chooses to get/read information from the vault and accesses the vault services using a browser, for example. At step 710, a prompt is issued by the vault services for an information identifier. At step 715, the user may enter an identifier, choose a preset identifier, or choose to "discover" any open or secure items in the information vault associated with the identifier. One way that the discovery process may work is for the system to determine all combinations of the user's public key and identifiers. Any resulting has locations that have an open or secure item would be returned. At step 720, the vault service may use a one way hash algorithm to determine the location of the information employing the user's public key. At step 725, using the vault map, the information is retrieved by the information vault services from the vault.

At step 730, the information is decrypted with the vault's private key and encrypted with the user's public key. At step 735, a charge may be assessed for the transaction, if appropriate. An audit log entry may also be created. At step 740, the user retrieves the information. At step 745, the user decrypts the information with a private key and at step 750, the user may log off.

Figure 8:
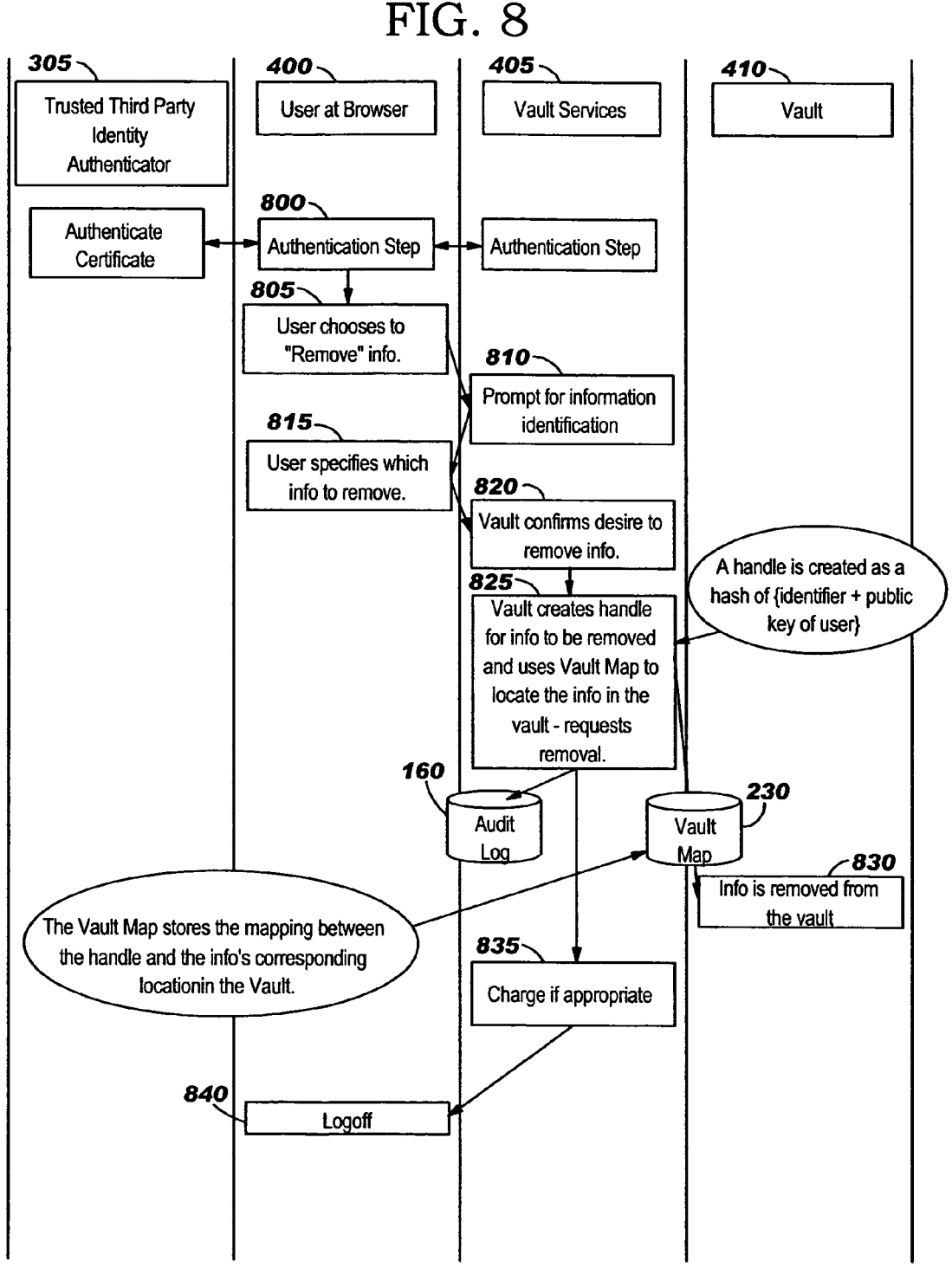
FIG. 8 is a swim lane diagram of an embodiment showing steps of removing information from a user account.

FIG. 8 is a swim lane diagram of an embodiment showing steps of removing information from a user account, beginning at step 800 where the user and vault services mutually authenticate one another (e.g., process of FIG. 4). At step 805, the user may choose to "remove" information from the vault by accessing vault services. At step 810, the vault services prompt for identification information from the user. At step 815, the user specifies which information to remove, which may be an identifier, or choose to "discover" any open/secure items in the information vault.

At step 820, the vault services confirm the request to remove information. At step 825, the vault services use the public key of the user and identifier to create a hash value to access the vault map 230 to find the information and request removal of the information. At step 830, the information is deleted from the vault. An audit log 160 may be entered recording the removal. At step 835, a charge is created as appropriate for the removal activity. At step 840, the user may log off.

Figure 9:
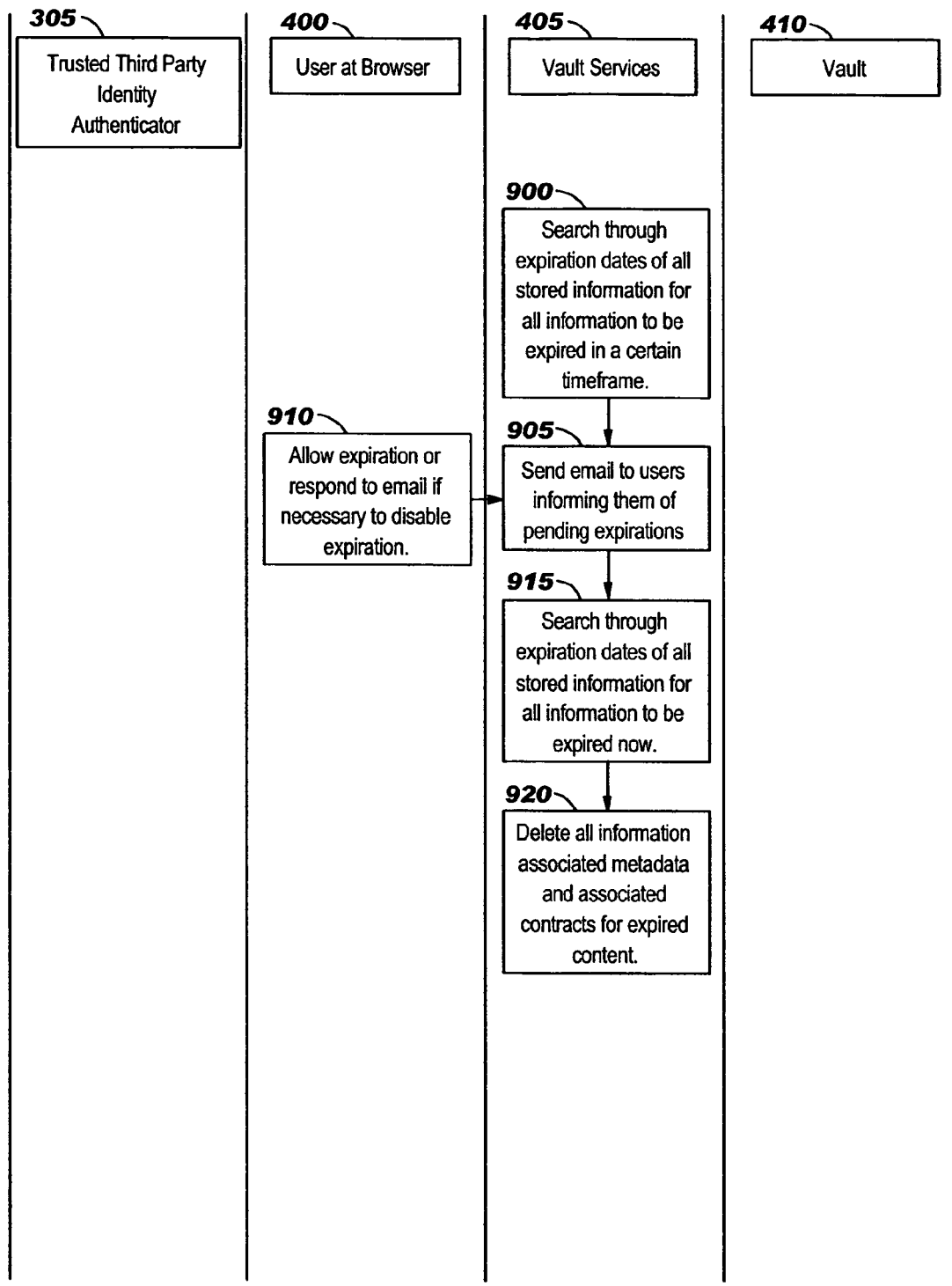
FIG. 9 is a swim lane diagram of an embodiment showing steps of expiring information from a user account.

FIG. 9 is a swim lane diagram of an embodiment showing steps of expiring information from a user account. At step 900, the vault services periodically (e.g., on a pre-determined schedule such as daily, monthly or other time basis) or continuously as a background activity, searches through the expiration dates of stored information for all information to be expired in a certain time frame. At a pre-determined time (e.g., a week, month, or similar time basis) prior to the actual expiration, users may be notified of any pending expirations. This notification may typically be an email notification or similar communication. At step 910, the user may respond to the notification in order to disable or reset the expiration, or may allow the expiration to occur by not responding. At step 915, the vault services locate all information that is scheduled to currently be expired at the pre-determined time. At step 920, at the pre-determined time, all information scheduled for expiration is deleted along with any associated metadata and contracts. The process may continue at step 900.

Figure 10:
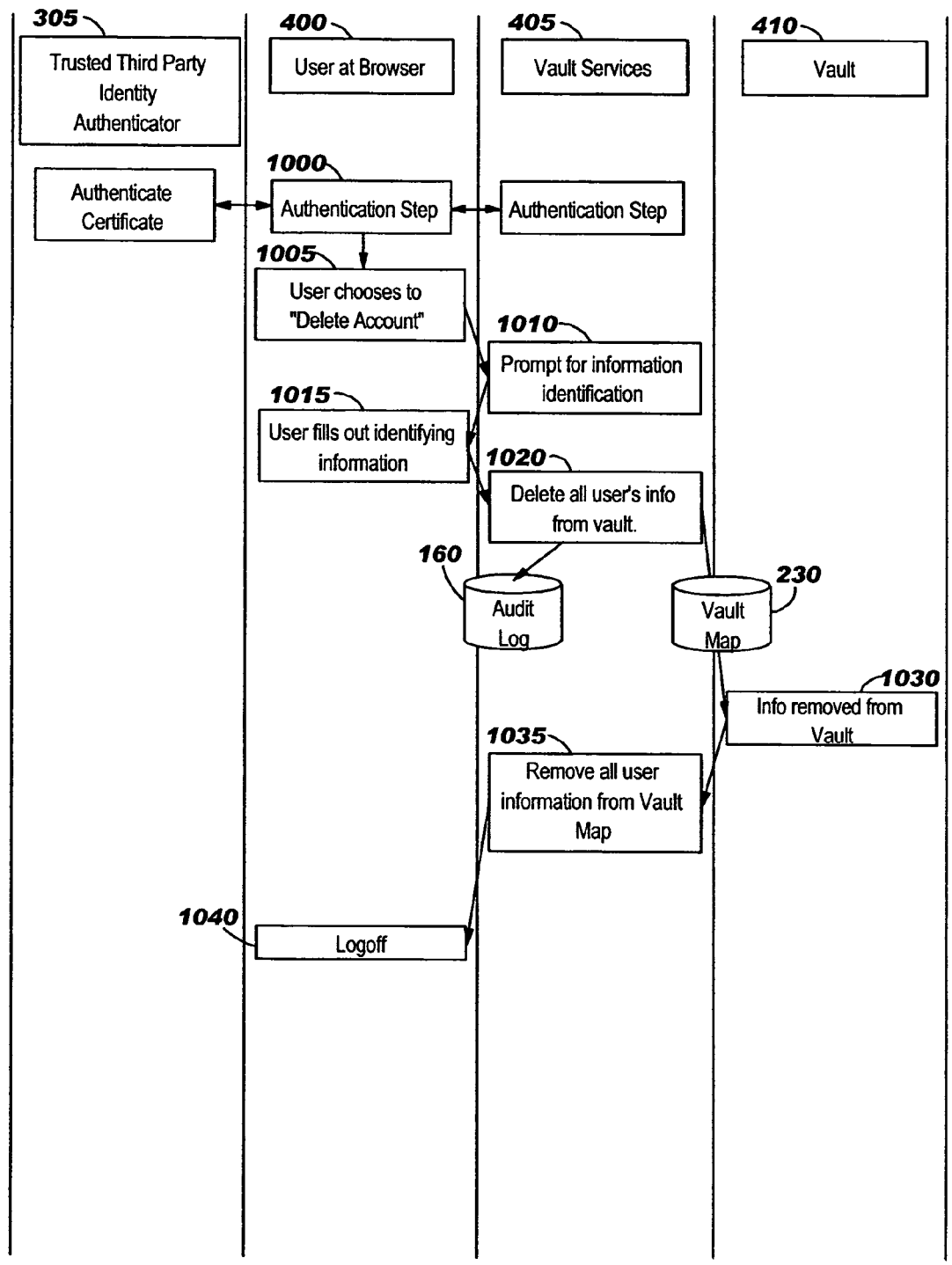
FIG. 10 is a swim lane diagram of an embodiment showing steps of deleting a user account.

FIG. 10 is a swim lane diagram of an embodiment showing steps of deleting a user account, beginning at step 1000 where the user 400 and vault services 405 mutually authenticate one another (e.g., process of FIG. 4). At step 1005, a user may choose an account to delete. At step 1010, the vault services prompt for identification information. At step 1015, the user enters identifying information of the account. At step 1020, the vault may re-affirm the account deletion and if the user affirms the deletion, a hash is computed to determine where the information resides using the vault map 230. An audit log 160 may also be entered to record the activity. At step 1030, all stored information associated with the specified user account may be removed and all contracts with the user's information as associated with the account may be removed. Any demographic data and financial information may also be removed as associated with the account. At step 1035, all user information associated with the account may be deleted from the vault map. At step 1040, the user may log off.

Figure 11:
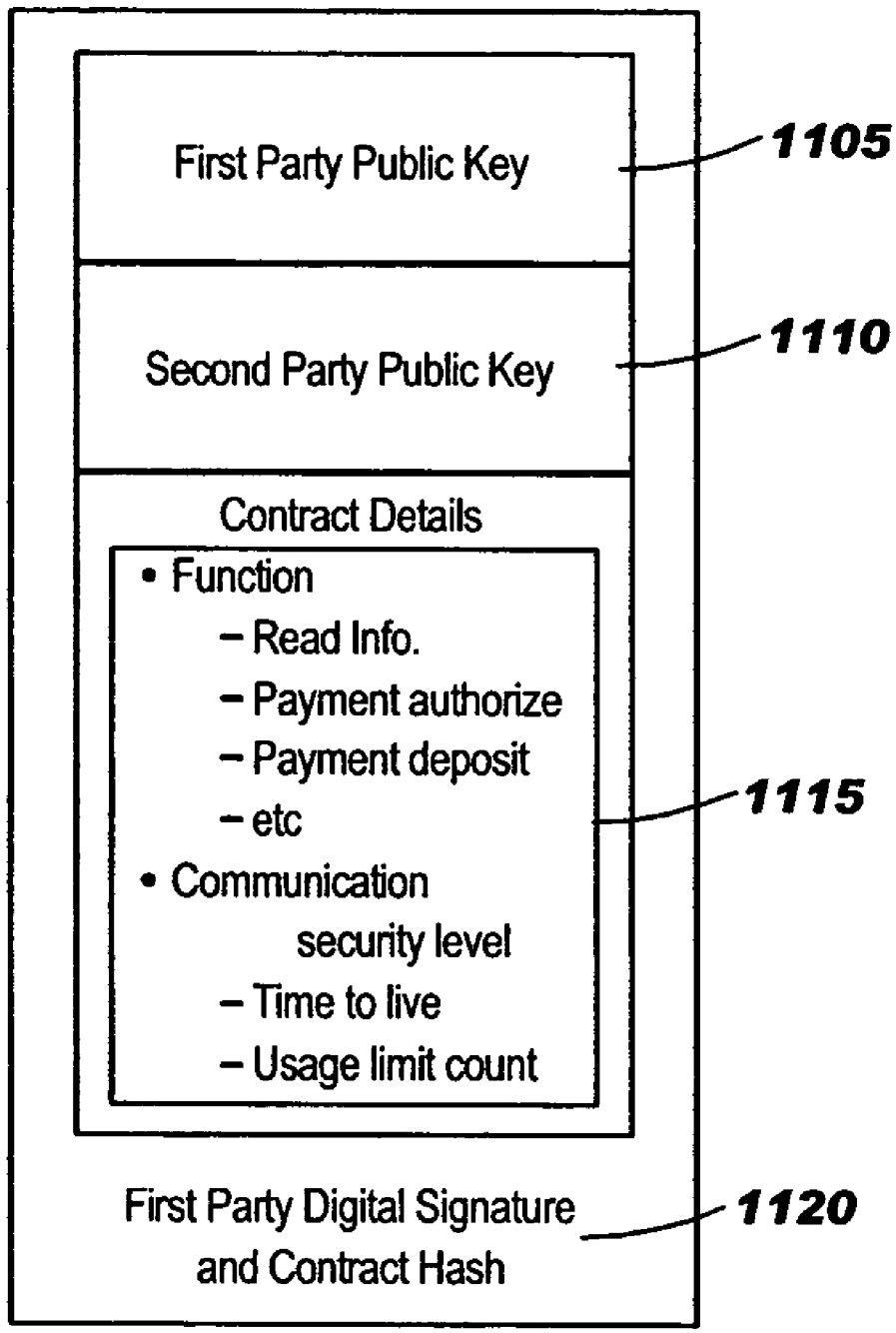
FIG. 11 is an illustrative diagram of an embodiment of a second party contract.

FIG. 11 is an illustrative diagram of an embodiment of a second party contract, generally denoted by reference numeral 1100. Second party access to user information may be controlled via the "contract" mechanism of this system. The contract 1100 is typically a data structure that may be created by the first party and given to the second party as a contract token that may be honored by the information vault 100. The contract 1100 may contain information identifying the two party entities and the functional exchange agreed by the contract. For example, the contract may define whether a phone number or an address may be given to a second party. Or, the contract may allow the vault to perform other services on behalf of the parties.

The information vault executes the required functional exchange after authenticating the integrity of the contract token and that the service requester is indeed the second party as called out in the contract. The contract defines the agreement between the first and second party. The information vault 100 typically executes this contract as the trusted third party. This contract 1100 may be held by the second party or deposited in the information vault 100. The contract 1100 is digitally hashed and signed by the first party's private key, generally denoted by reference numeral 1120. This allows the information vault 100 to ensure that the contract 1100 has not been altered since creation.

The contract 1100 also includes the first party public key 1105, the second party public key 1110, and contract details 1115. The contract details 1115 may include the agreed upon function(s) which may be read information, payment authorization, payment deposit, or similar information. The contract details 1115 may further include the communication security level, the time to live (e.g., an expiration date), and a usage limit count to control the number of times transactions may occur.

Figure 12:
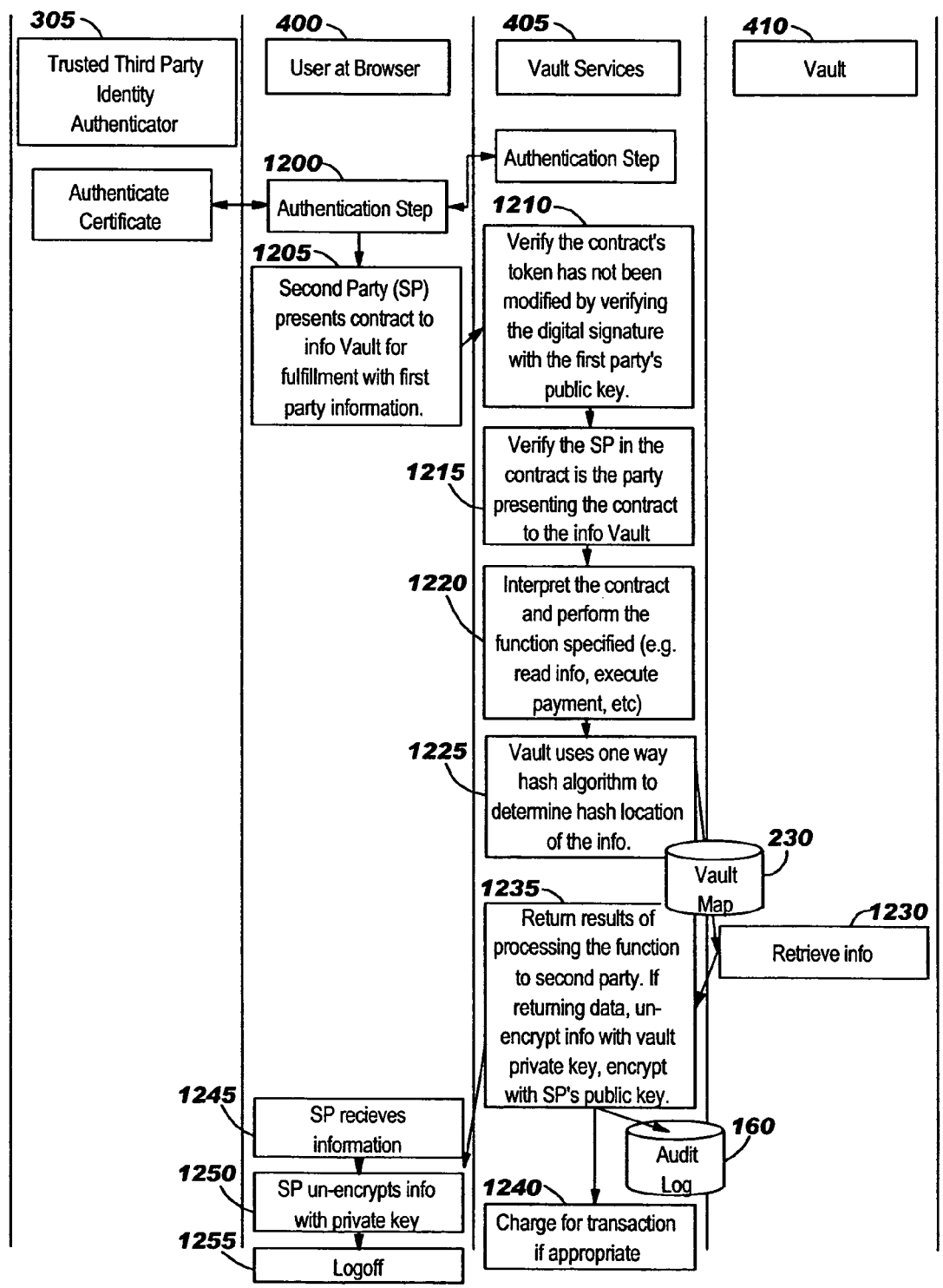
FIG. 12 is a swim lane diagram of an embodiment showing steps of a second party contract fulfillment.

FIG. 12 is a swim lane diagram of an embodiment showing steps of a second party contract fulfillment, beginning at step 1200, where the second party 1200 and vault services 405 mutually authenticate one another (e.g., via the process of FIG. 4). At step 1205, a second party presents a contract 1100 to the information vault 100 for fulfillment. At step 1210, the vault services verify that the contract's token has not been modified by verifying the digital signature with the first party's public key. At step 1215, the vault services verify that the second party in the contract is the party presenting the contract to the information vault. At step 1220, the contract may be interpreted and the functions specified in the contract details executed. At step 1225, the vault services use a one way hash and the vault map 230 to locate the associated information in the vault.

At step 1230, the information is retrieved from the vault. At step 1235, any results of processing the functions of the contract are returned to the second party. Any data to be returned may be decrypted using the vault's private key and may be re-encrypted with the second party's public key. An entry into the audit log 160 may also be made to record the access. At step 1240, any appropriate charge may be made for the transaction. At step 1245, the second party receives the information. At step 1250, the second party decrypts the information using the second party private key. At step 1255, the second party may log off.

Figure 13:
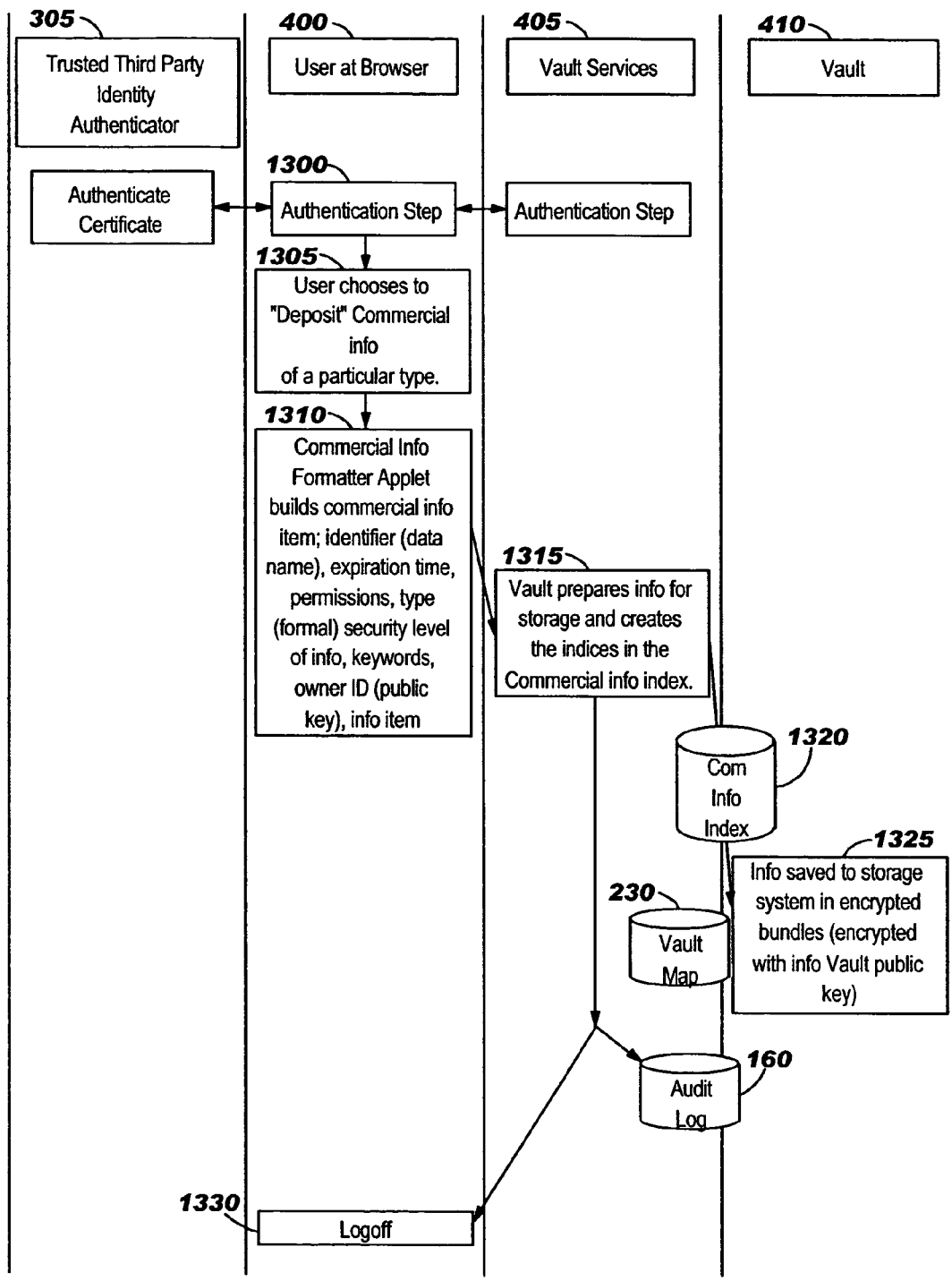
FIG. 13 is a swim lane diagram of an embodiment showing steps of commercial information deposit.

FIG. 13 is a swim lane diagram of an embodiment showing steps of commercial information deposit, beginning at step 1300 where the user 400 and vault services 405 mutually authenticate one another (e.g., via process of FIG. 4). At step 1305, the user chooses to "deposit" commercial information of a particular type into the vault. At step 1310, the user may employ a commercial data formatter applet (CDFA), typically downloaded to a user's computer, to build a commercial information item. The CDFA, when instantiated on the user's computer, guides the user to enter the appropriate information including any descriptive indexing information. The CDFA may prompt for an identifier (data name), expiration time, permissions, type (format), security level, keywords, owner ID (e.g., public key) and may confirm the information with the user and deposits the commercial information with the vault services.

At step 1315, the vault services prepare the commercial information for storage and create the indices into a commercial information index 1320 and create a handle for the information. At step 1325, the commercial information is physically stored in the vault with the vault map 230 updated with the mapping of the information item handle to physical storage reference. The indexing information obtained during the commercial data-formatting step and the information item handle may be stored in the commercial information index 1320. This set of tables may map the obtained indices to the commercial information item handle. The storing of the item in the vault, updating the vault map 230 and the updating of the commercial information index is typically one unit of work. At step 1330, an acknowledgement of success may be passed back to the user at the browser and the user may then log off. In this way, the vault may store data on behalf of a first party that may be of interest to second party and made accessible to the second party (e.g., a business). The commercial index facilitates access to this data.

Figure 14:
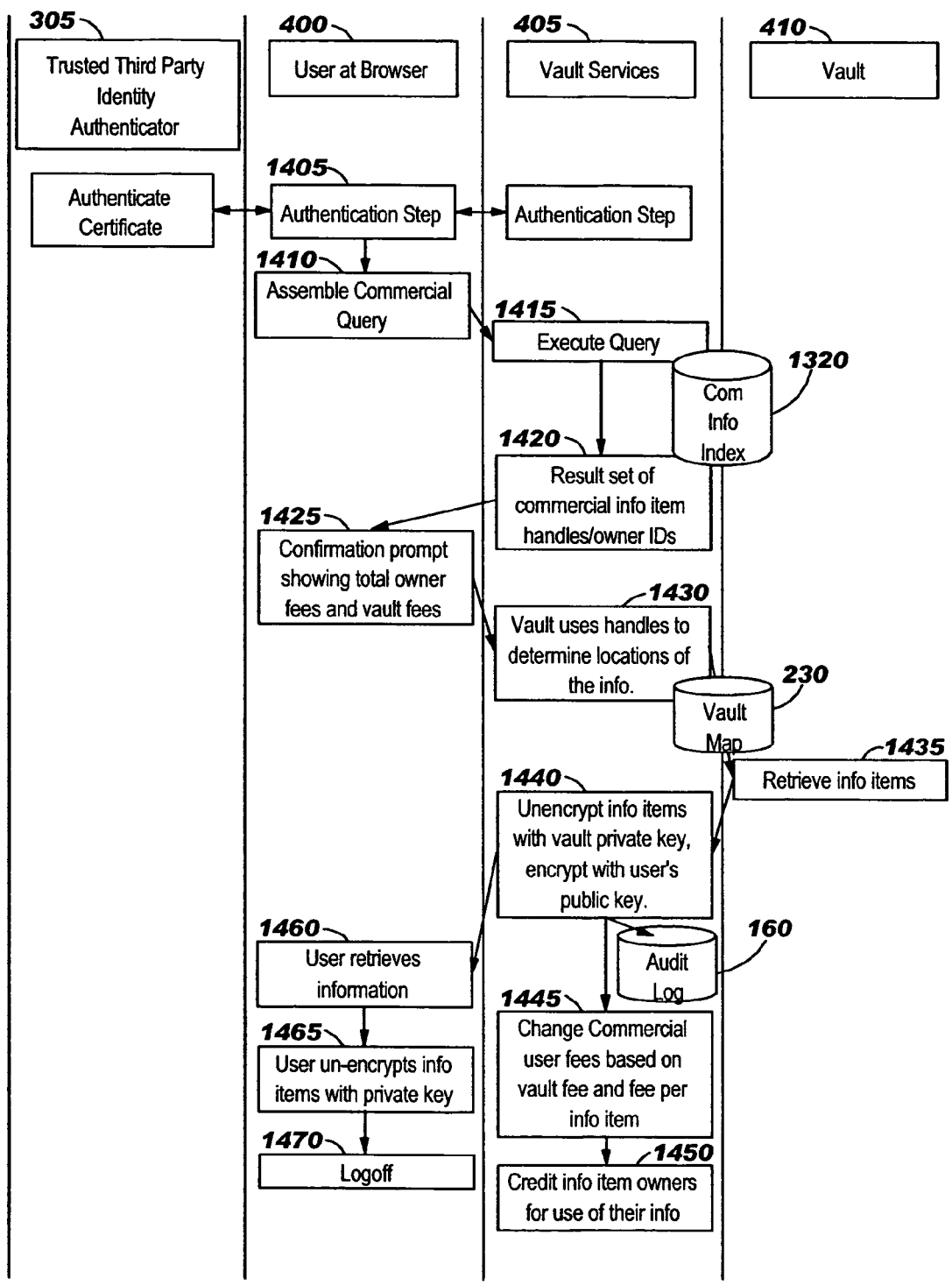
FIG. 14 is a swim lane diagram of an embodiment showing steps of commercial access to first party information.

FIG. 14 is a swim lane diagram of an embodiment showing steps of commercial access to first party information, beginning at step 1405 where the commercial second party and vault services 405 mutually authenticate one another (e.g., via process of FIG. 4). At step 1410, a commercial second party chooses to perform a query of the commercial information of a particular type. A query applet may be provided and instantiated for use by the second party commercial user. At step 1415, the query may be passed to the vault services by the query applet where the query may be executed using the commercial information index 1320.

At step 1420, the result set that meets the query criteria typically includes commercial information item handles and/or owner IDs. At step 1425, a confirmation prompt may be presented to the commercial user that may include an indication of the number of hits and actual cost to the commercial user. The fee structure may be based on fees to the vault and per item fees to the owners of the information.

At step 1430, the vault services use the handles to determine the locations of the information via the vault map 230. At step 1435, if the user chooses to proceed, the vault services retrieve the information from the vault. At step 1440, information items are decrypted using the vault's private key and re-encrypted using the commercial user's public key and returned to the commercial user. An audit log entry may be entered recording the facts of the transaction. At step 1445, any appropriate charges to the commercial user based on vault fees and/or per item fees may be made, perhaps through the vaults financial backend interface to a bank, or the like.

At step 1450, credit to the information owner may be made for use of the information. This amount may vary significantly depending on the particular information "sold" and/or fee schedules. These fees may accumulate until a threshold is met and then the account balances may be applied to the owner. At step 1460, the commercial user retrieves the information and, at step 1465, the commercial user decrypts the information items using a private key. At step 1470, the commercial user may log off.

Figure 15:
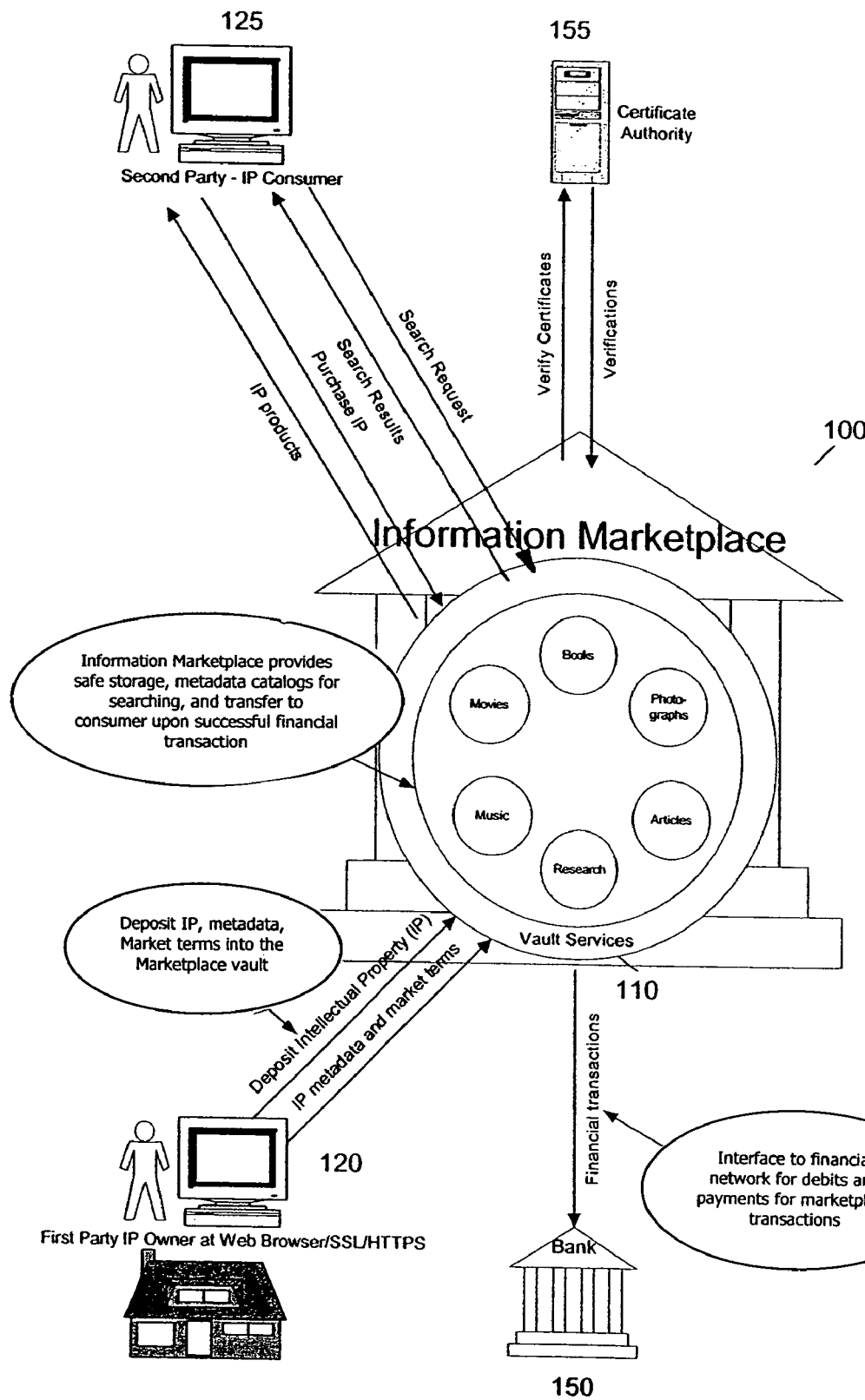
FIG. 15 is an exemplary overview of an alternate embodiment of the invention.

FIG. 15 is an exemplary overview of another embodiment. An "Information Marketplace", (also referred to as a vault) generally denoted by reference numeral 100A, provides for an information infrastructure storing intellectual property, for example, books, movies, music, photographs, articles and research, as well as IP metadata and market terms. Metadata catalogs can be stored within the marketplace 100A for searching and transfer to consumers upon successfully completing financial transactions. The vault 100A employs current data storage and security technologies to provide a secure storage mechanism for user's information. A computer system 120 (e.g., a personal computer) may be employed by a user to read or remove information from the vault or to deposit information to the vault.

Similar to above, a set of services 110 are provided, built on the vault's secure storage, to allow users to create accounts, deposit information in an escrow, release data from the escrow, and remove the information from escrow. Information may be stored in the vault encrypted by the vault and optionally, users may encrypt the information with their own private key. In addition, the vault services 110 are provided to allow a user to specify conditions, in a secure way, e.g., via technologies of the existing Public Key Infrastructure (PKI), so that a second party 125 may search the vault 100A and purchase intellectual products.

FIG. 15 shows that the invention is based on, and does not replace, the financial network for payments (e.g., banking 150) for information vault services or Certificate Authorities 155 of the PKI for certificate and key verifications. The interface to the bank 150 may include interfaces to financial networks for debits and payments for vault transactions and services.

As noted above, the information vault allows data to be uploaded by the information owner and the data is protected, e.g., by a PKI based access control system that only permits access by people who have been granted the privilege. Additionally, a financial back end can execute financial transactions, such as debits or credits, against the information owner's bank account of information user's bank account.

Escrow System

An escrowing service can be provided to control possession of assets. In the case of digital data, the asset could be safely stored in the vault by a first party (referred to as a depositor). The asset can be held until agreed upon conditions are satisfied, in which case a second party (referred to as a recipient) can retrieve the data.

The two parties can agree to use the escrow service to store the asset, or at least an identifier indicating where the asset is stored. Once employed, the first party deposits the asset and then defines the conditions for release of the asset to the second party. In the case of digital data, the escrow service can store the asset. The escrow service evaluates access conditions and provides access to the second party, when the condition(s) are satisfied. Advantages of such a system include leveraging of the high security of the vault, to protect both parties. The escrow system provides a low cost alternative to physical media storage of electronic content.

In one embodiment, a trustee can mediate the exchange. In another embodiment, execution of a financial transaction can satisfy the escrow conditions.

Figure 16:
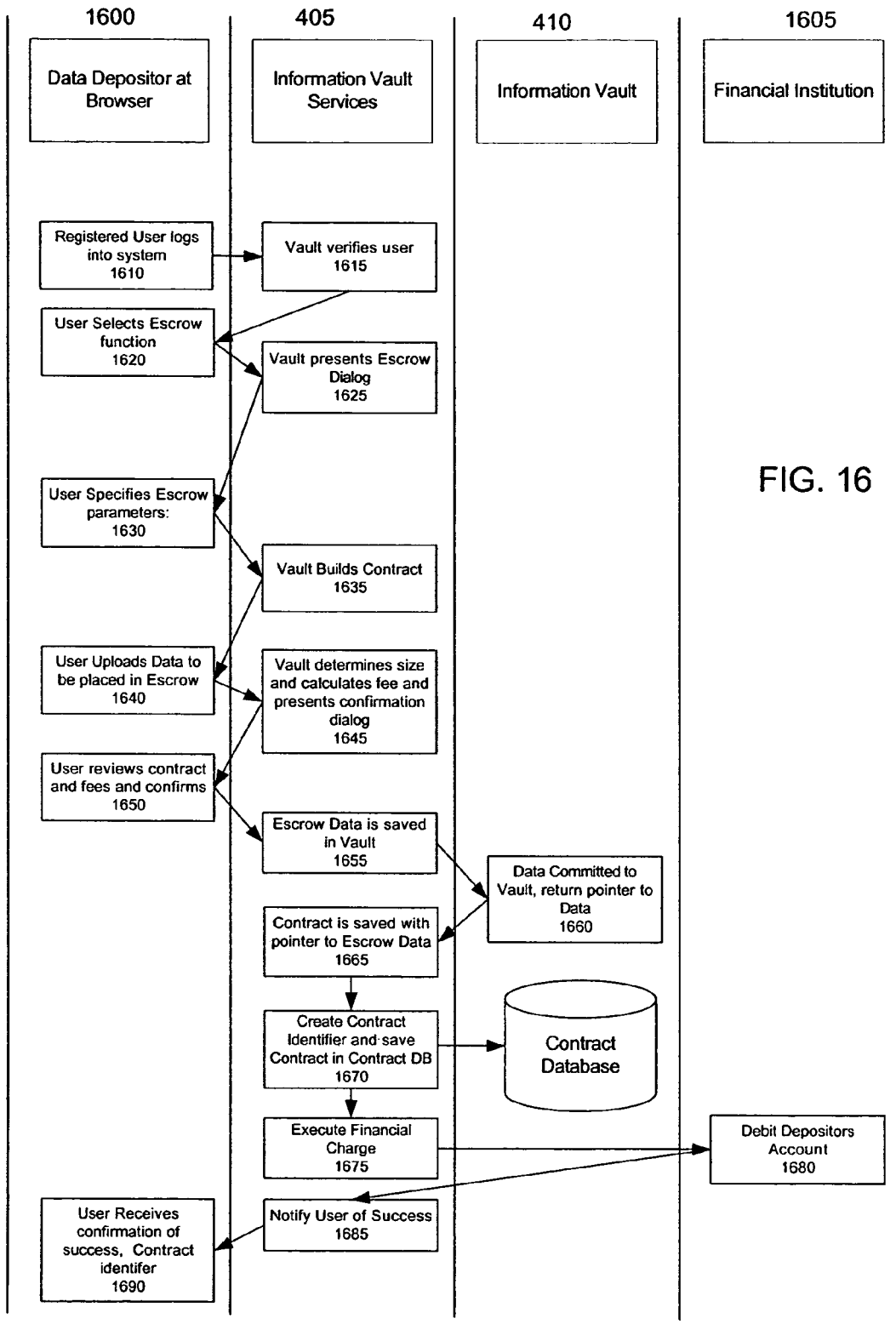
FIG. 16 is a swim lane diagram of an embodiment showing a depositor placing data in escrow.

FIG. 16 is a swim lane diagram showing an embodiment of data deposit. Four lanes are shown including a lane for a data depositor (typically at a browser) 1600, a lane for vault services 405, a lane for the vault 410, and a lane for a financial institution 1605. At step 1610, the user logs into the system and is verified by the vault (step 1615). At step 1620, the user selects the escrow function and at step 1625 the vault presents an escrow dialog, e.g., with a graphical user interface.

At step 1630, the user specifies escrow parameters. An exemplary parameter indicates how to release the escrow, (e.g., by a trustee, by the depositor, by a date, by a payment, by fulfillment of another escrow contract, etc.). Other exemplary parameters include: who the recipient is, who is to receive payment as the condition for releasing the escrowed data, and whether the escrow is reversible, i.e., can be canceled at some future time by the depositor. In each case, the depositor may indicate the person by an identifier, such as the public key.

If the depositor indicates that the escrow will be released upon fulfillment of another escrow contract, the depositor must identify the other escrow contract. If a payment is designated as the release condition, the depositor should specify the dollar value that must be received by the vault financial services in order to fulfill the release condition. Similarly, if release by date is specified, the depositor should indicate the date and time when the release occurs.

After the information is received, the information vault services builds a contract at step 1635. Building the contract includes assigning a contract ID, and setting the contract state. In one embodiment, the contract state can include initiated, released, fulfilled, expired, and reversed. When building the contract has been completed, the state is set to initiated. After release has been approved (described in more detail below), the state is set to released. After the information has been retrieved from the escrow, the state is set to fulfilled. Building the contract can also include associating an ID of the depositor with the contract based upon the depositor's login. A public key can be used as the ID.

At step 1640, the user uploads the data to be placed in the escrow. In response, at step 1645, the vault determines the size of the data and calculates fees. The fees may be calculated based upon the amount of system resources being used, e.g., the amount of storage necessary for the uploaded data. In addition, or alternatively, a one time flat fee may be charged or other schemes are contemplated.

After the user reviews the contract and fees and accepts them at step 1650, the escrow data is saved in the vault at step 1655. The vault then stores the data and returns a pointer to the data, at step 1660. At steps 1665 and 1670, the contract is saved with a pointer to the escrow data and the contract is saved in a contract database with the contract identifier, which could be created at this time rather than when then the contract is built at step 1635. In one embodiment, the contract persists as a row in the contract database.

At step 1675, a financial charge is executed and, at step 1680, the financial institution debits the depositors account. Finally, at steps 1685 and 1690, the user is notified of the successful transaction and receives the contract identifier.

Figure 17:
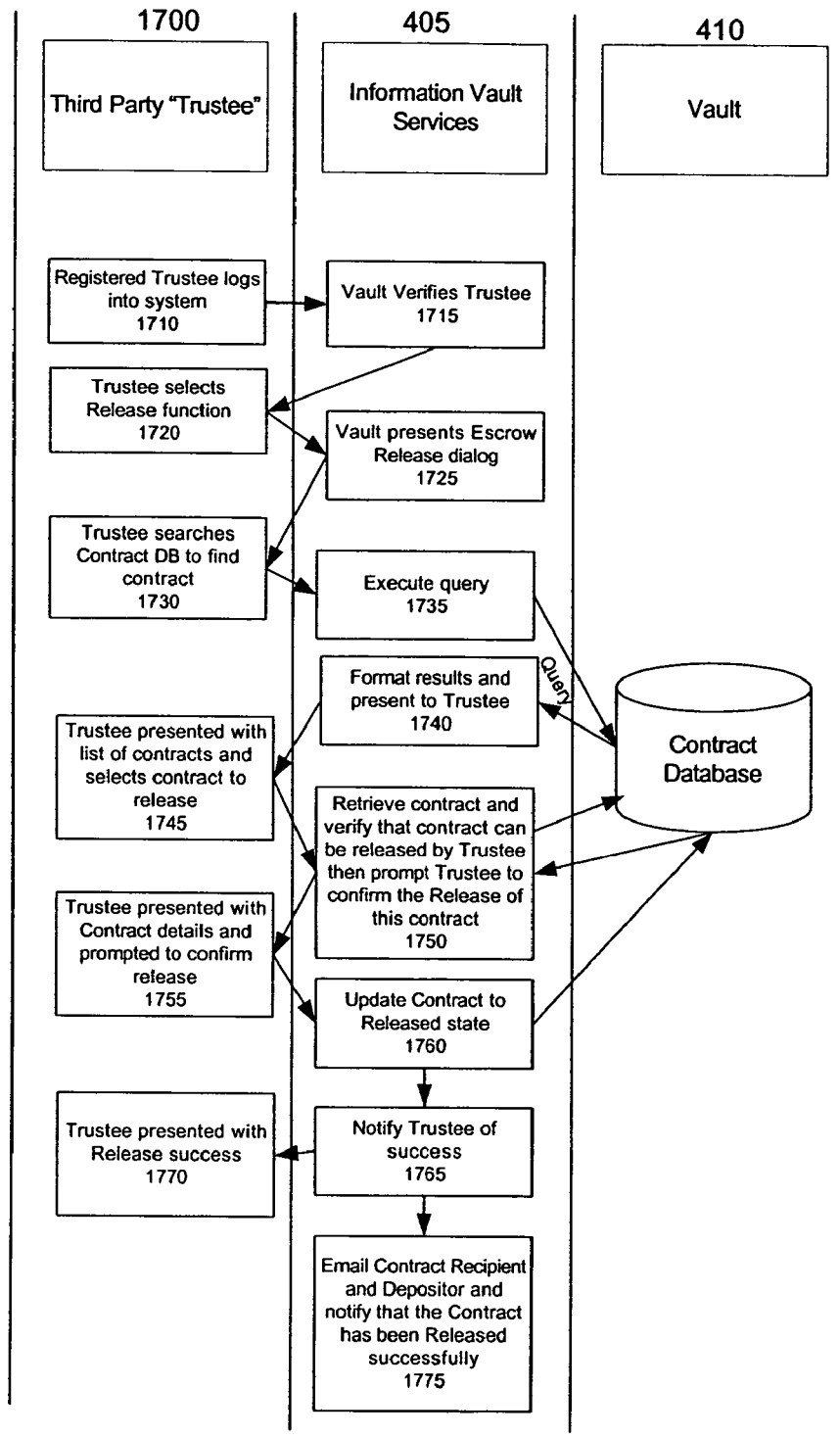
FIG. 17 is a swim lane diagram of an embodiment showing a trustee releasing data from escrow.

FIG. 17 is a swim lane diagram showing an embodiment of escrow release by a trustee. Three lanes are shown including a lane for a third party trustee 1700, a lane for vault services 405, and a lane for the vault 410. At steps 1710 and 1715, the registered trustee logs into the system and is authenticated. After authentication, the trustee selects a release function and is presented with a release dialog at steps 1720 and 1725. For example, at step 1725, a PKI key is used to verify the trustee.

The trustee then searches the contract database to locate the correct contract at step 1730. The search can be based upon, e.g., the contract ID or the trustee's ID. At steps 1735 and 1740, the query is executed and the results are retrieved from the database, formatted, and presented to the trustee. At step 1745, the trustee selects the contract to be released.

At step 1750, the contract is retrieved from the contract database and it is verified that the trustee is eligible to release the contract. The trustee is then prompted to confirm release of the contract. At step 1755, the trustee is presented with the contract details and confirms release. At step 1760, the contract is updated to a released state. At steps 1765 and 1770, the trustee is notified of the successful release. Finally, at step 1775, the contract recipient and the depositor are notified that the contract has been released. At this time, the recipient is eligible to retrieve the escrowed data.

Figure 18:
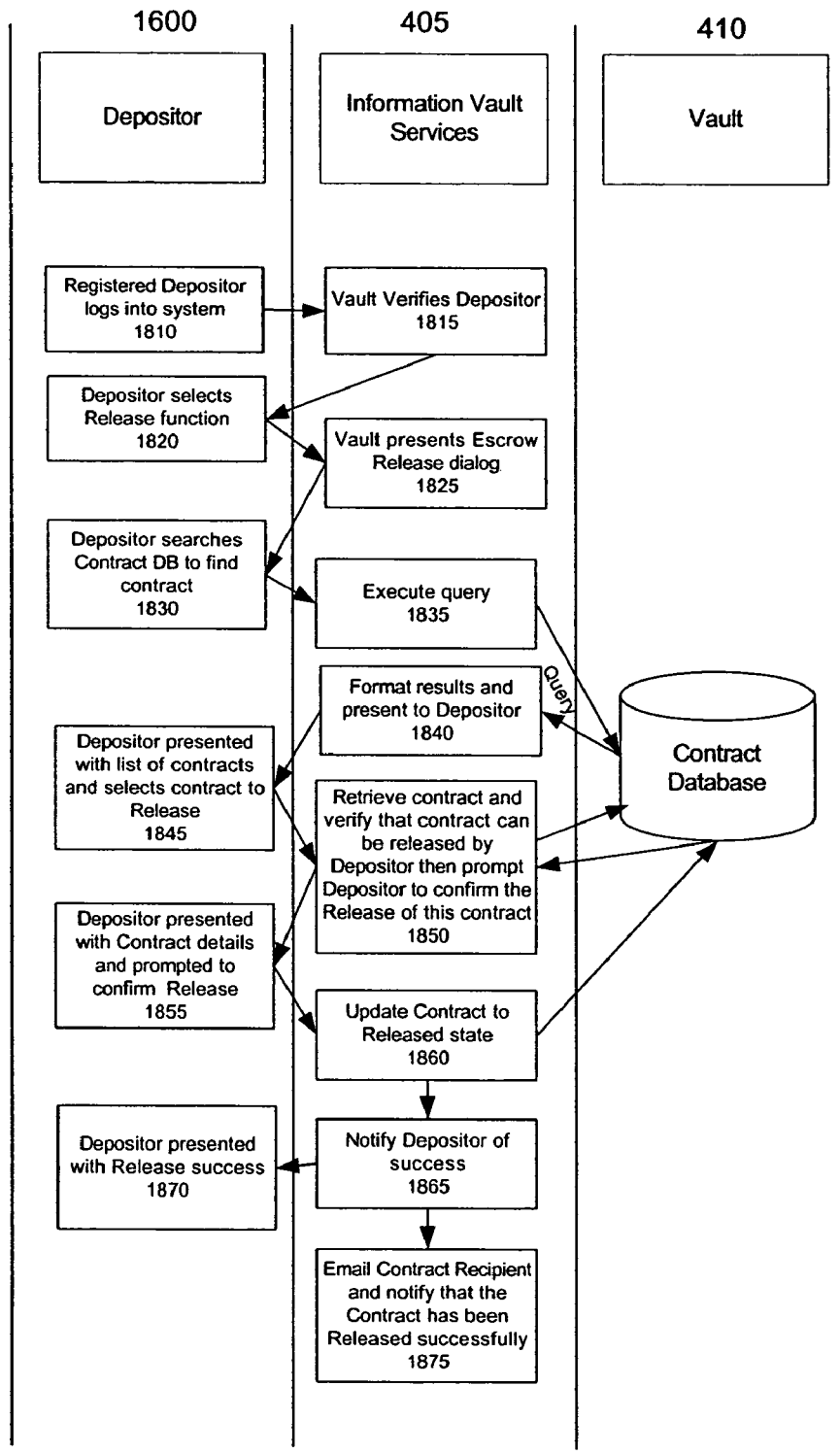
FIG. 18 is a swim lane diagram of an embodiment showing a depositor releasing data from escrow.

FIG. 18 is a swim lane diagram showing an embodiment of escrow release by a depositor. Three lanes are shown including a lane for a depositor 1600, a lane for vault services 405, and a lane for the vault 410. At steps 1810 and 1815, the registered depositor logs into the system and is authenticated. After authentication, the depositor selects a release function and is presented with a release dialog at steps 1820 and 1825.

The depositor then searches the contract database to locate the correct contract at step 1830. The search can be based upon, e.g., the contract ID or the depositor's ID. At steps 1835 and 1840, the query is executed and the results are retrieved from the database, formatted, and presented to the depositor. At step 1845, the depositor is presented with a list of contracts and selects the contract to be released.

At step 1850, the contract is retrieved from the contract database and it is verified that the depositor is eligible to release the contract. The depositor is then prompted to confirm release of the contract. At step 1855, the depositor confirms release and at step 1860 the contract is updated to a released state. At steps 1865 and 1870, the depositor is notified of the successful release. Finally, at step 1875, the contract recipient is notified that the contract has been released.

Figure 19:
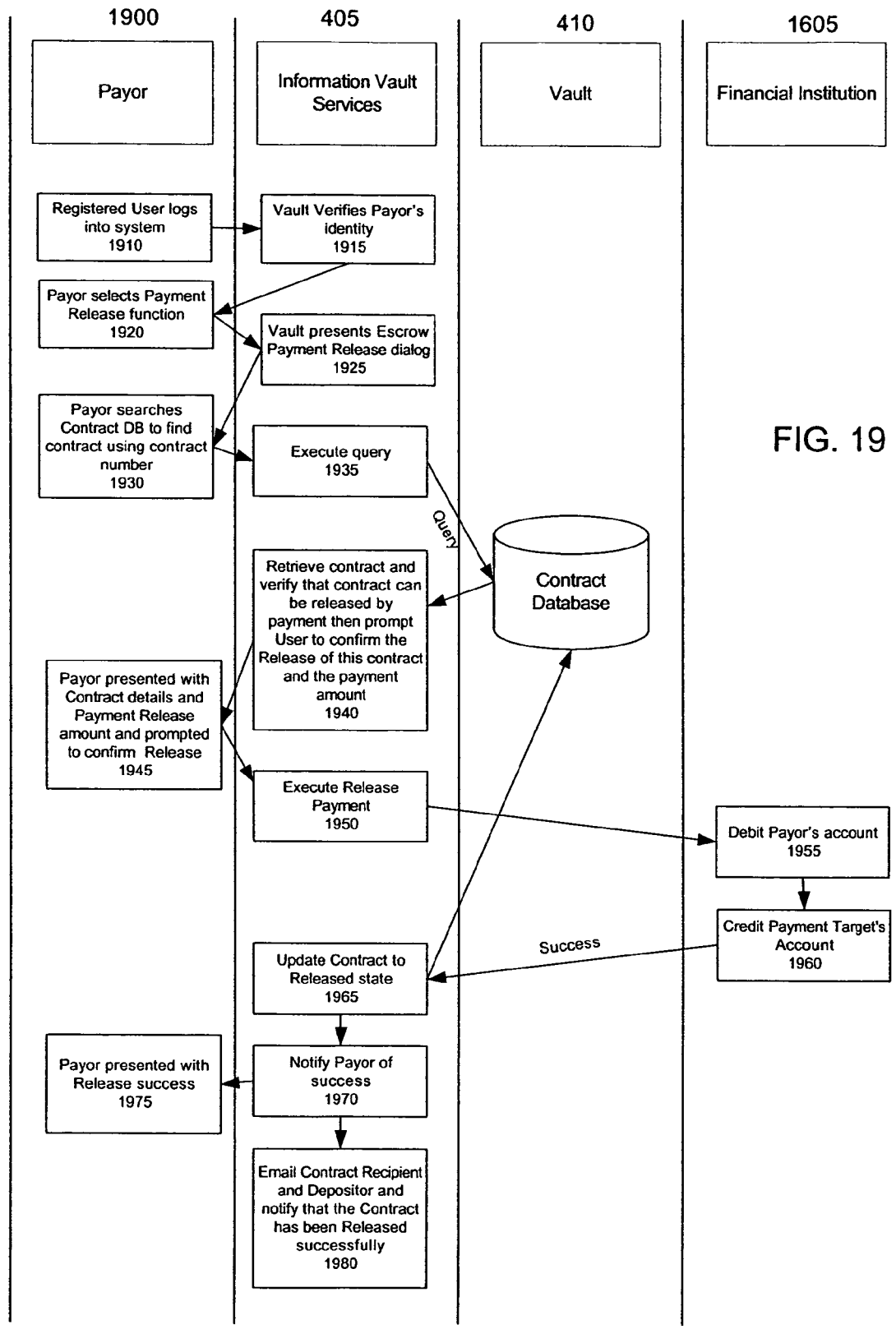
FIG. 19 is a swim lane diagram of an embodiment showing a direct payment releasing data from escrow.

FIG. 19 is a swim lane diagram showing an embodiment of escrow release by direct payment. Four lanes are shown including a lane for a payor 1900, a lane for vault services 405, a lane for the vault 410, and a lane for the financial institution 1605. At steps 1910 and 1915, the registered payor logs into the system and is authenticated. After authentication, the payor selects a release function and is presented with a release dialog at steps 1920 and 1925.

The payor then searches the contract database to locate the correct contract, at step 1930. In this example, the search is based upon the contract ID, although it could be searched based upon other criteria. At steps 1935 and 1940, the query is executed, the contract is retrieved from the contract database, and it is verified that the payment can release the contract. The payor is then prompted to confirm release of the contract and to confirm the payment amount. At step 1945, the payor confirms release.

At step 1950, the release payment is executed. The financial institution then debits the payor's account at step 1955 and credits the entity that receives payment as the condition for releasing the escrowed data at step 1960. At step 1965, the contract is updated to a released state. At steps 1970 and 1975, the payor is notified of the successful release. Finally, at step 1980, the contract recipient and depositor are notified that the contract has been released.

Figure 20:
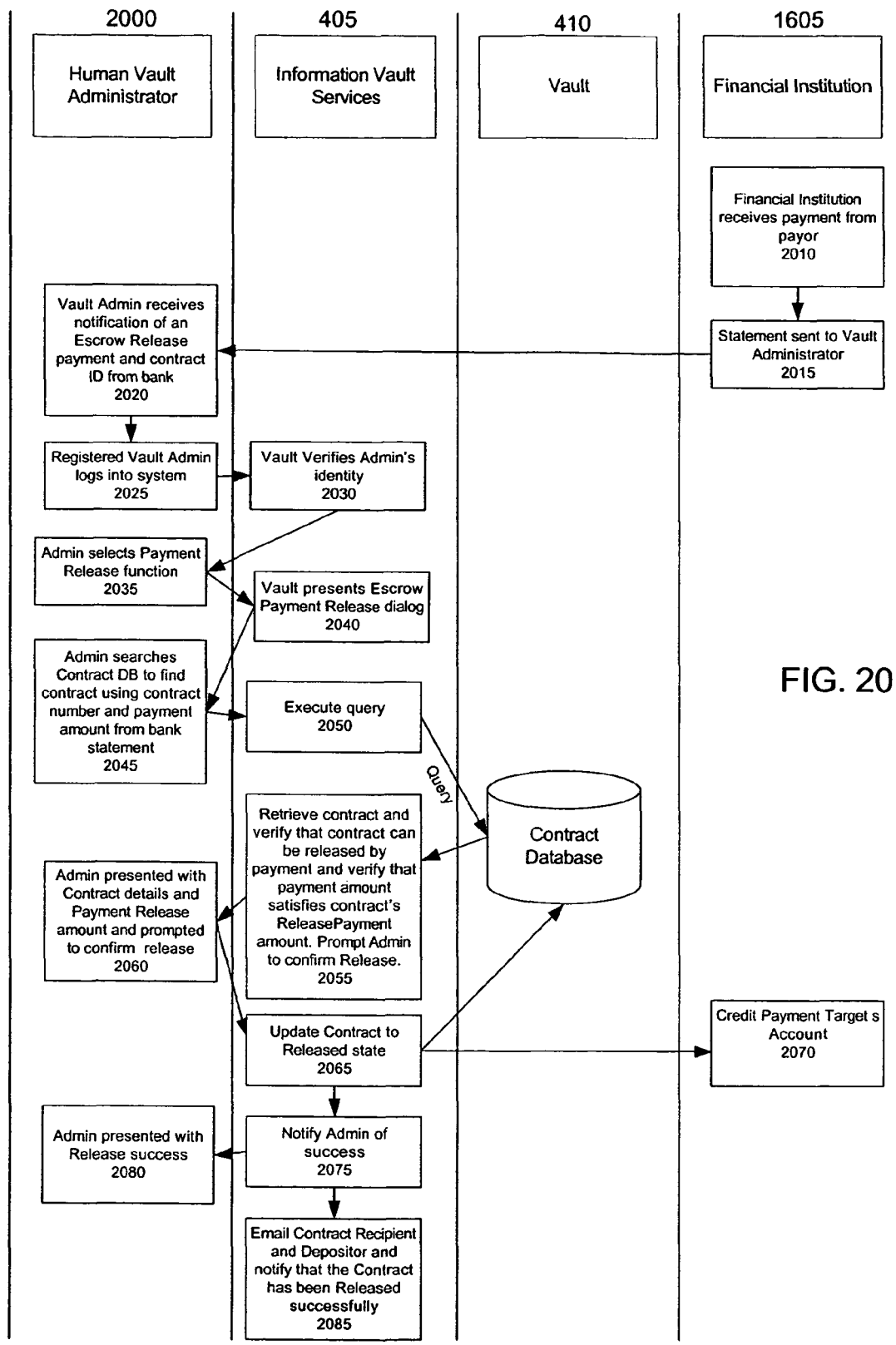
FIG. 20 is a swim lane diagram of an embodiment showing an indirect payment releasing data from escrow.

FIG. 20 is a swim lane diagram showing an embodiment of escrow release by indirect payment. Four lanes are shown including a lane for a human vault administrator 2000, a lane for vault services 405, a lane for the vault 410, and a lane for the financial institution 1605. At step 2010, the financial institution receives payment from a payor. The payment can be received, for example, via wire payment or direct deposit. In either case, the deposit should include a note specifying the contract ID. After the payment is received, the financial institution informs the vault administrator of the escrow release payment and the contract ID, at step 2015. At step 2020, the vault administrator receives notice of the escrow release payment and the contract ID and then logs into the system, at steps 2025 and 2030. After authentication, the administrator selects a release function and is presented with a release dialog at steps 2035 and 2040.

The administrator then searches the contract database to locate the correct contract using the contract ID and the payment amount, at step 2045. At steps 2050 and 2055, the query is executed, the contract is retrieved from the contract database, and it is verified that the payment should release the contract. The administrator is then prompted to confirm release of the contract and to confirm the payment amount. At step 2060, the administrator confirms release and at step 2065 the contract's state is updated to released.

The financial institution then credits the entity receiving payment as the condition for releasing the escrowed data, at step 2070. At steps 2075 and 2080, the administrator is notified of the successful release. Finally, at step 2085, the contract recipient and depositor are notified that the contract has been successfully released.

Figure 21:
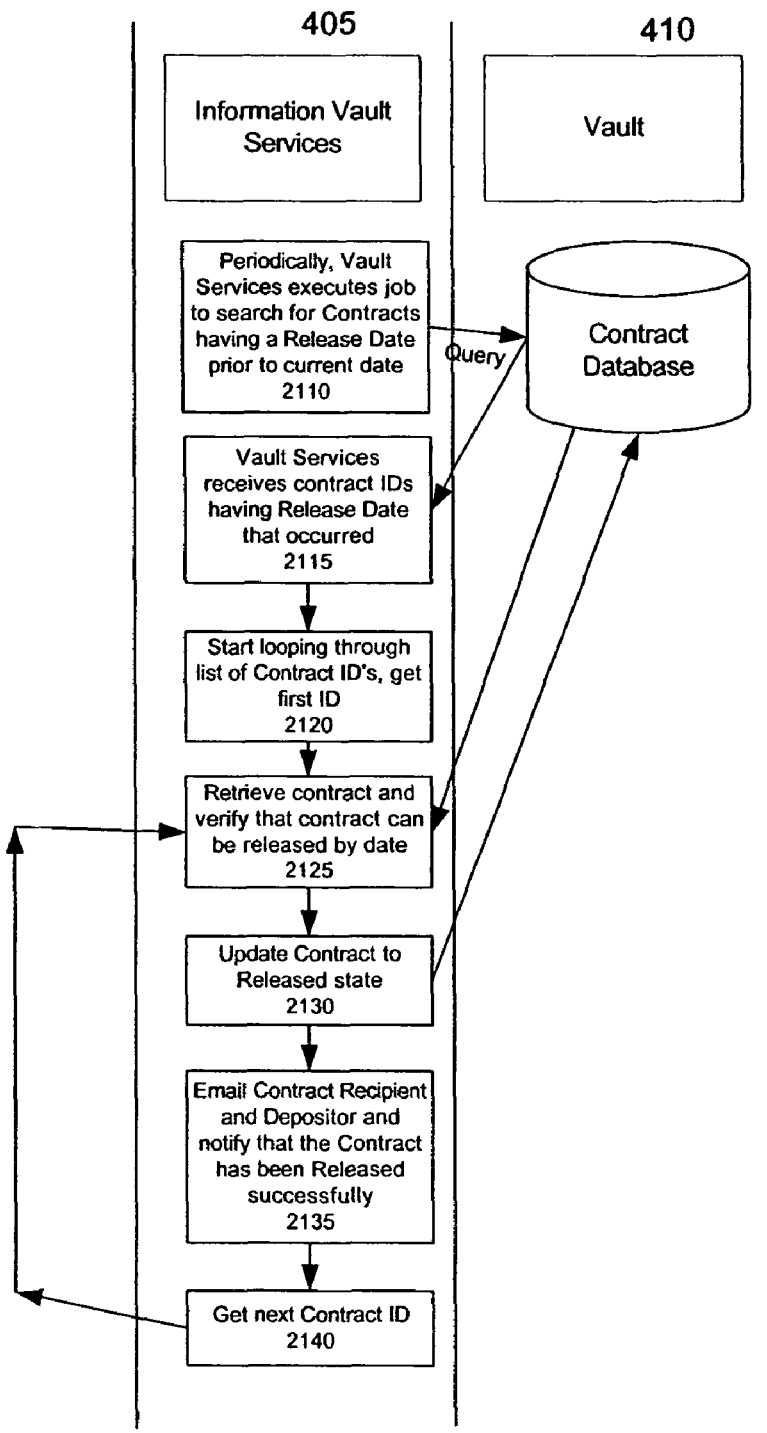
FIG. 21 is a swim lane diagram of an embodiment showing a date release of data from escrow.

FIG. 21 is a swim lane diagram showing an embodiment of escrow release by date. Two lanes are shown including a lane for vault services 405, and a lane for the vault 410. At step 2110, vault services periodically (e.g., daily) searches for contracts released by a date that is earlier than the current date. Although this example refers to date, date and time can also be used.

After receiving the contract IDs of contracts having a release date that has already occurred at step 2115, at step 2120, vault services selects the first of the contract IDs. At step 2125, the contract corresponding to the selected ID is retrieved and it is confirmed that the contract can be released by the date. If so, at step 2130 the contract's state is updated to released. At step 2135, the contract recipient and depositor are notified that the contract has been successfully released. At step 2140, the next contract ID is selected and the process returns to step 2125 until all matching contract IDs have been processed.

Although not shown in a figure, an escrow can be released by fulfillment of another escrow. In other words, escrows can be cascaded. This function can be supported by executing a query for dependent escrows upon setting a particular escrow state to be fulfilled. For each dependent escrow returned in the results, the system sets the contract state to be fulfilled.

Figure 22:
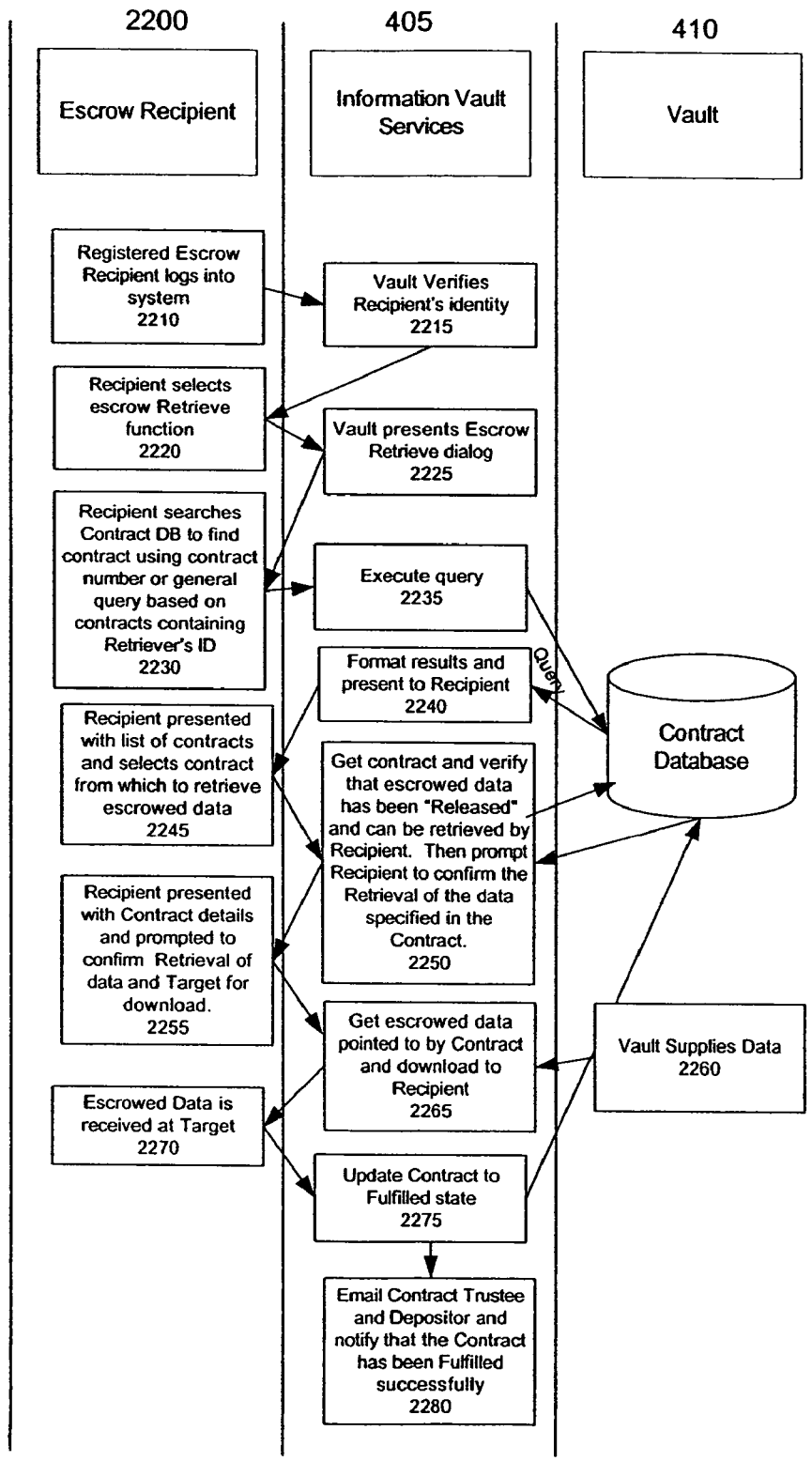
FIG. 22 is a swim lane diagram of an embodiment showing retrieval of data from escrow.

FIG. 22 is a swim lane diagram showing an embodiment of retrieving data from the escrow. Three lanes are shown including a lane for an escrow recipient 2000, a lane for vault services 405, and a lane for the vault 410. At steps 2210 and 2215, the escrow recipient logs into the system. After authentication, the recipient selects a retrieve function and is presented with an escrow retrieve dialog at steps 2220 and 2225.

The recipient then searches the contract database to locate the correct contract using, e.g., the contract ID or a general query based upon the retriever's ID, at step 2230. At steps 2235 and 2240, the query is executed and the results of the query are formatted and presented to the recipient. At step 2245, the recipient receives the list of contracts resulting from the query, and then selects the desired contract. At step 2250, the contract is retrieved from the contract database and it is verified that the escrowed data has been released and can be retrieved by the recipient. The recipient is then prompted to confirm retrieval of the data specified in the contract. At step 2255, the recipient reviews the contract details and confirms retrieval of the data and the location where the data is to be downloaded to. At step 2260, the vault supplies the data and, at step 2265, the data is downloaded to the recipient. The specified location then receives the data at step 2270. At step 2275, the contract's state is updated to fulfilled. Finally, at step 2280, the trustee (if any) and depositor are notified that the contract has been successfully fulfilled.

Figure 23:
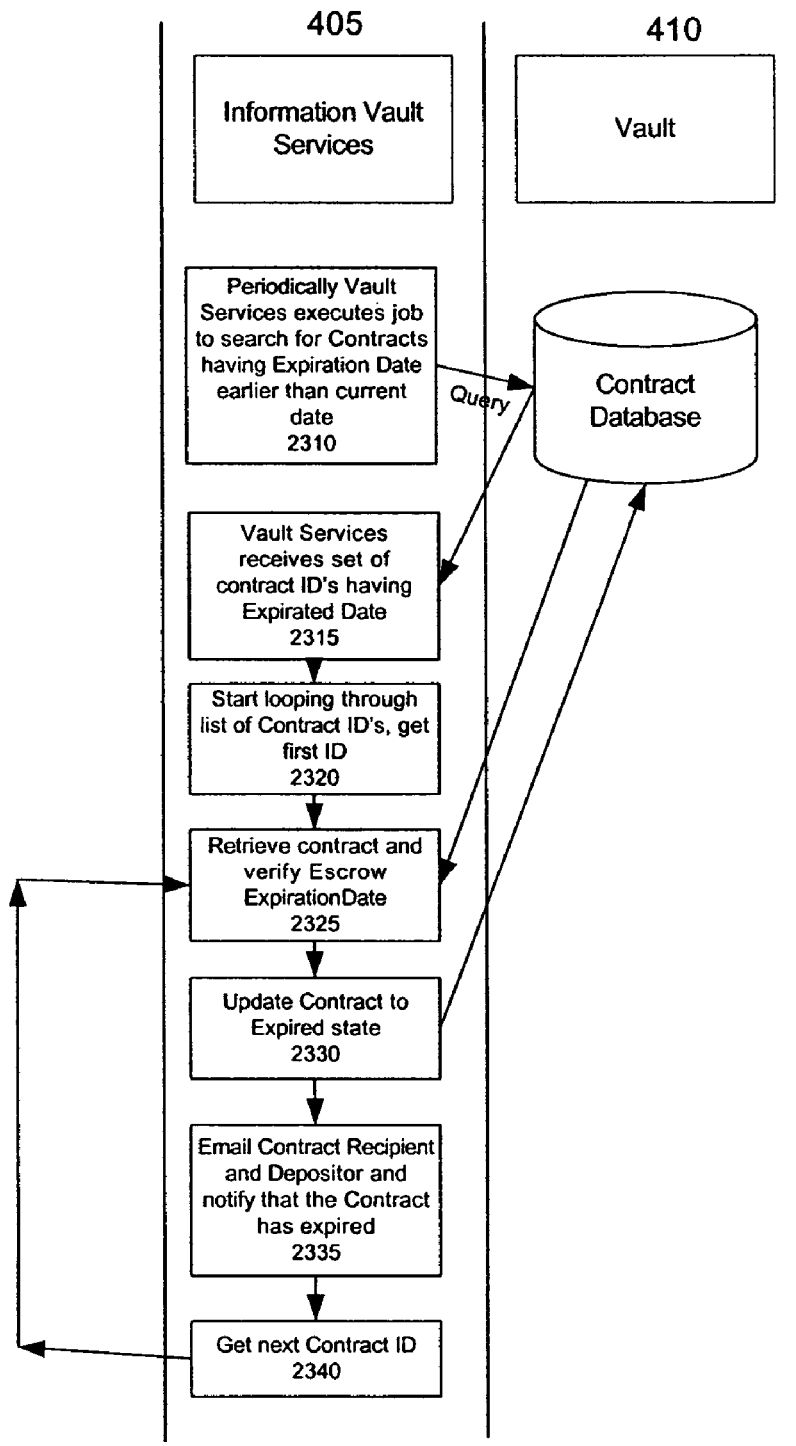
FIG. 23 is a swim lane diagram of an embodiment showing an escrow expiration.

FIG. 23 is a swim lane diagram showing an embodiment of escrow expiration. Two lanes are shown including a lane for vault services 405, and a lane for the vault 410. At step 2310, vault services periodically (e.g., daily) searches for contracts having an expiration date that is earlier than the current date. Although this example refers to date, date and time can also be used.

After receiving the contract IDs of contracts having an expiration date that has already occurred at step 2315, at step 2320, vault services selects the first of the contract IDs. At step 2325, the contract corresponding to the selected ID is retrieved and the expiration date is confirmed. If confirmed, at step 2330, the contract's state is updated to expired. At step 2335, the contract recipient and depositor are notified that the contract expired. At step 2340, the next contract ID is obtained and the process returns to step 2325 until all qualifying contract IDs have been processed.

Figure 24:
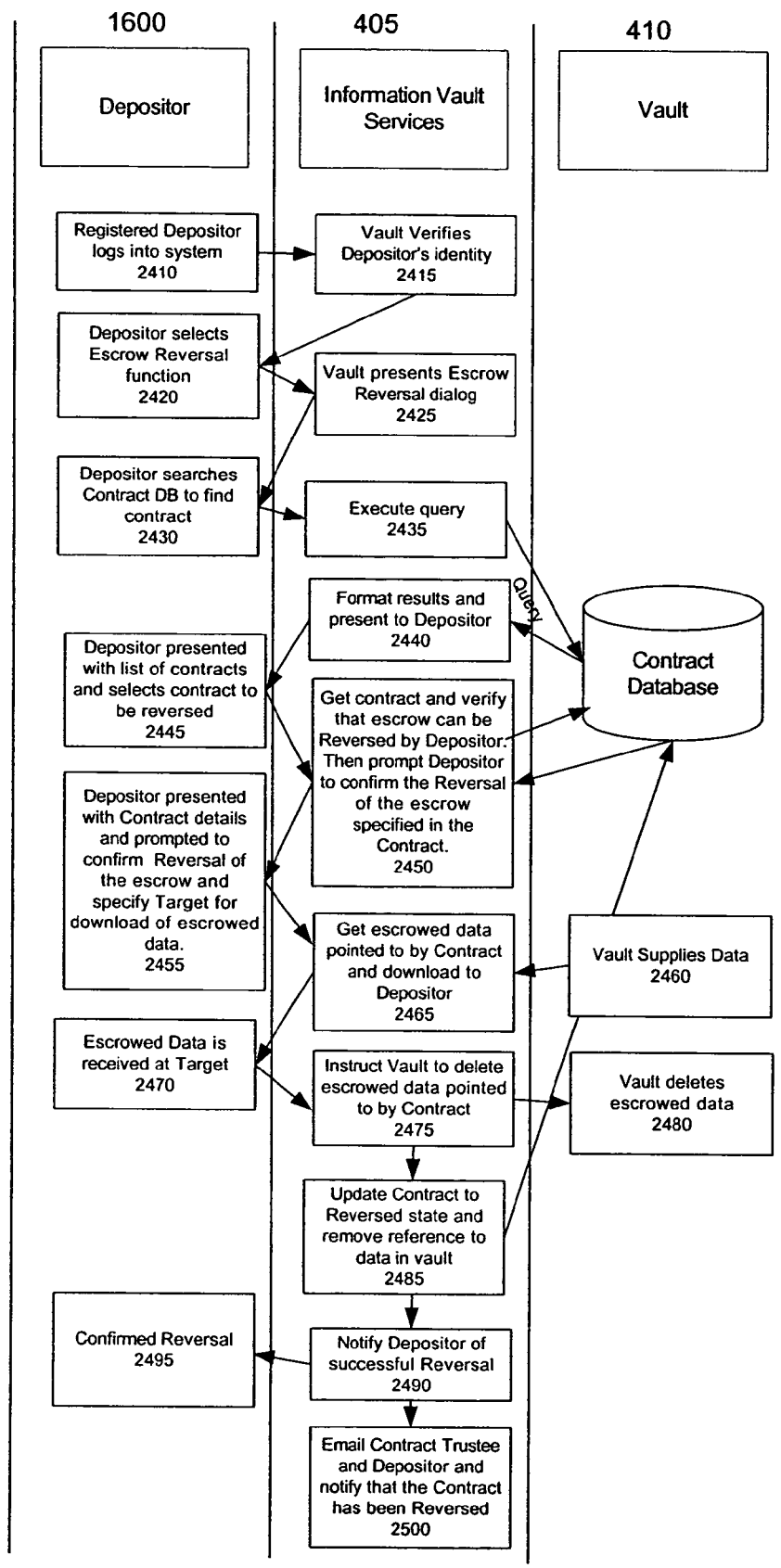
FIG. 24 is a swim lane diagram of an embodiment showing an escrow reversal.

FIG. 24 is a swim lane diagram showing an embodiment of escrow reversal by a depositor. Three lanes are shown including a lane for a depositor 1600, a lane for vault services 405, and a lane for the vault 410. At steps 2410 and 2415, the registered depositor logs into the system and is authenticated. After authentication, the depositor selects an escrow reversal function and is presented with a reversal dialog at steps 2420 and 2425.

The depositor then searches the contract database to locate the correct contract at step 2430. The search can be based e.g., upon the contract ID or the depositor's ID. At steps 2435 and 2440, the query is executed and the results are retrieved from the database, formatted, and presented to the depositor. At step 2445, the depositor selects the contract to be reversed.

At step 2450, the selected contract is retrieved from the contract database and it is verified that the depositor is eligible to reverse the contract. The depositor is then prompted to confirm reversal of the contract. At step 2455, the depositor confirms reversal and indicates the target location for the download. At step 2460, the vault supplies the data. At step 2465, the escrowed data is obtained, using the pointer in the contract, and then downloaded to the target location. At step 2470, the escrowed data is received at the specified target location. At step 2475, the vault services then instructs the vault to delete the escrowed data associated with the contract. At step 2480, the vault deletes the escrowed data.

At step 2485, the contract is updated to a reversed state and the reference to the data is removed. At steps 2490 and 2495, the depositor is notified of the successful release. Finally, at step 2500 the contract recipient is notified that the contract has been reversed.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-RNV) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. For example, although digital data has been described, tangible assets can also be escrowed at another location. In this case the escrow system can be used to control release of the object stored elsewhere. An asset ID can be stored in the vault, therefore hiding the identity of the asset. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. A method for escrowing data, comprising:
   receiving escrow parameters using a processor and a memory, the escrow parameters comprising at least one condition for releasing the escrowed data, and an escrow recipient;
   creating an escrow contract using the processor and the memory, the escrow contract based upon specified escrow parameters of the escrow parameters;
   storing the escrowed data in a secure information vault;
   storing the escrow contract, along with an association to the stored escrowed data, in a database;
   the processor and the memory determining when the at least one condition has been satisfied;
   the processor and the memory releasing the escrowed data to the escrow recipient when the at least one condition has been satisfied; and
   wherein the at least one condition comprises a payment sum.

2. The method of claim 1, wherein releasing the escrowed data further comprises:
   identifying the escrow contract;
   receiving an instruction from a payor to execute the payment sum; and
   instructing a financial institution to debit an account of the payor and credit an account of a payment target, wherein the escrowed data is released from the secure information vault after the credit to the payment target.

3. The method of claim 1, wherein releasing the escrowed data further comprises:

receiving an indication that a payment has been received;
receiving a contract ID;
retrieving the escrow contract based upon the contract ID;
receiving an instruction to release the escrowed data when the payment satisfies the payment sum; and instructing a financial institution to credit an account of a payment target.

4. The method of claim 1, wherein the at least one condition comprises at least one of a date and a time.

5. The method of claim 1, wherein the at least one condition comprises an indication from a depositor.

6. The method of claim 1, wherein the at least one condition comprises an indication from a trustee.

7. The method of claim 1, wherein the at least one condition comprises an indication from a vault administrator.

8. The method of claim 1, wherein the at least one condition comprises fulfillment of another escrow contract.

9. A system for escrowing digital data, comprising:
a server providing information vault services that receive escrowed digital data and escrow parameters, the escrow parameters comprising at least one condition for releasing the escrowed digital data, and an escrow recipient;
a secure information vault that stores the escrowed digital data; and
a contract database for storing an escrow contract, along with a pointer to the escrowed digital data that is stored in the secure information vault, the escrow contract comprising the at least one condition and the escrow recipient;
wherein the server determines when the at least one condition has been satisfied, and when the at least one condition has been satisfied, the server releases the escrowed digital data to the escrow recipient; and further wherein the at least one condition comprises a payment sum and wherein the server releases the escrowed digital data by:
identifying the escrow contract stored in the contract database;
receiving an instruction from a payor to pay a release sum;
receiving confirmation that the release sum matches the payment sum specified in the identified escrow contract; and
instructing a financial institution to debit an account of the payor for the release sum and credit an account of a payment target for the release sum when the release sum matches the payment sum, wherein the escrowed digital data is released from the secure information vault after the credit to the payment target.

10. The system of claim 9, wherein the server releases the escrowed digital data by:
receiving an indication that the release sum has been received;
receiving a contract ID; and
identifying the escrow contract stored in the contract database by retrieving the escrow contract based upon the contract ID;
wherein the payment target is designated in the contract.

11. An apparatus for escrowing data, comprising:
a processor and a memory providing vault services that receive the escrowed data, store the escrowed data in a vault, and receive escrow parameters comprising at least one condition for releasing the escrowed data, and an escrow recipient;
the vault services creating an escrow contract comprising the at least one condition and the escrow recipient; and
the vault services determining when the at least one condition has been satisfied and releasing the escrowed data to the escrow recipient when the at least one condition has been satisfied;
wherein the at least one condition comprises a payment sum; and
the vault services:
release the escrowed data by receiving an instruction from a payor to pay a release sum;
receive confirmation that the release sum matches the payment sum specified in the escrow contract; and
instruct a financial institution to debit an account of the payor for the release sum and credit an account of a payment target for the release sum when the release sum matches the credit, wherein the escrowed data is released from the secure information vault after the credit to the payment target.

12. An apparatus for escrowing data, comprising:
a processor and a memory providing vault services that receive the escrowed data, store the escrowed data in a vault, and receive escrow parameters comprising at least one condition for releasing the escrowed data, and an escrow recipient;
the vault services creating an escrow contract comprising the at least one condition and the escrow recipient; and
the vault services determining when the at least one condition has been satisfied and releasing the escrowed data to the escrow recipient when the at least one condition has been satisfied; wherein
the at least one condition comprises a payment sum; and
the vault services releases the escrowed data when an indication is received that a payment has been received, the releasing includes:
verifying that the escrow contract can be released by payment;
releasing the escrowed data when the payment satisfies the payment sum designated in the escrow contract; and
instructing a financial institution to credit an account of a payment target designated in the escrow contract, wherein the escrowed data is released from the secure information vault after the credit to the payment target.

* * * * *

UNITED STATES PATENT AND TRADEMARK OFFICE
CERTIFICATE OF CORRECTION

| | | |
|---|---|---|
| PATENT NO. | : 8,224,725 B2 | Page 1 of 1 |
| APPLICATION NO. | : 11/227539 | |
| DATED | : July 17, 2012 | |
| INVENTOR(S) | : Clifton E. Grim, III | |

It is certified that error appears in the above-identified patent and that said Letters Patent is hereby corrected as shown below:

Page 2 of Patent, First Column, under "Foreign Patent Documents" -- Foreign Patent Document WO 02/29516 cited on second page is a duplicate citation of the Foreign Patent Document cited on the First Page of the Patent, and should be deleted.

Page 2 of Patent, Second Column of "Other Publications" -- References cited on Lines 1-13 are duplicate citations of references cited on Lines 14-26, and should be deleted.

Signed and Sealed this
Sixth Day of November, 2012

David J. Kappos
*Director of the United States Patent and Trademark Office*